(12) United States Patent
Yanagida et al.

(10) Patent No.: US 7,724,551 B2
(45) Date of Patent: May 25, 2010

(54) STEP-UP CIRCUIT AND PORTABLE DEVICE USING IT

(75) Inventors: Osamu Yanagida, Kyoto (JP); Yoshinori Imanaka, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 362 days.

(21) Appl. No.: 11/667,627

(22) PCT Filed: Oct. 19, 2005

(86) PCT No.: PCT/JP2005/019167

§ 371 (c)(1),
(2), (4) Date: May 10, 2007

(87) PCT Pub. No.: WO2006/061952

PCT Pub. Date: Jun. 15, 2006

(65) Prior Publication Data

US 2008/0013349 A1  Jan. 17, 2008

(30) Foreign Application Priority Data

Dec. 6, 2004  (JP)  ............................. 2004-352752
Dec. 15, 2004  (JP)  ............................. 2004-362315

(51) Int. Cl.
  *H02M 3/18* (2006.01)
  *H02M 7/00* (2006.01)
(52) U.S. Cl. ......................... 363/60; 323/266
(58) Field of Classification Search .................. 363/59, 363/60, 65; 323/266; 307/110; 327/536
  See application file for complete search history.

(56) References Cited

U.S. PATENT DOCUMENTS

| | | | |
|---|---|---|---|
| 5,362,990 A * | 11/1994 | Alvarez et al. | 327/538 |
| 5,717,581 A | 2/1998 | Canclini | |
| 5,821,805 A | 10/1998 | Jinbo | |
| 6,411,531 B1 * | 6/2002 | Nork et al. | 363/60 |
| 6,566,847 B1 * | 5/2003 | Chou et al. | 323/282 |
| 2002/0027426 A1 | 3/2002 | Okahara et al. | |
| 2002/0075705 A1 * | 6/2002 | Bayer et al. | 363/59 |
| 2002/0154524 A1 * | 10/2002 | Yamanaka et al. | 363/59 |
| 2003/0057469 A1 | 3/2003 | Karaki | |
| 2004/0227405 A1 | 11/2004 | Nonaka et al. | |

(Continued)

FOREIGN PATENT DOCUMENTS

DE  199 62 523  8/2001

(Continued)

*Primary Examiner*—Gary L Laxton
*Assistant Examiner*—Matthew Grubb
(74) *Attorney, Agent, or Firm*—Fish & Richardson P.C.

(57) ABSTRACT

According to the invention, as an input voltage of a certain step-up unit of a plurality of stages of step-up units, a stepped-up output of a step-up unit in a stage preceding the certain step-up unit is inputted. This makes it possible to increase the level of a voltage stepped up by each step-up unit, and reduce the number of units. Furthermore, according to the invention, when an output voltage of a step-up unit that performs stepping-up operation according to a reference constant current is lower than a reference voltage, a reference constant current is produced; when the output voltage thereof exceeds the reference voltage, the reference constant current is stopped. This makes it possible to provide stable output of an output voltage at a predetermined level, and reduce an inrush current during start-up to a predetermined current level.

11 Claims, 15 Drawing Sheets

U.S. PATENT DOCUMENTS

| | | |
|---|---|---|
| 2004/0227564 A1 | 11/2004 | Mayama et al. |
| 2005/0094421 A1* | 5/2005 | Flore et al. ............... 363/60 |
| 2005/0104651 A1* | 5/2005 | Hashimoto ............... 327/536 |
| 2006/0012409 A1* | 1/2006 | Wadhwa et al. ............ 327/143 |

FOREIGN PATENT DOCUMENTS

| | | |
|---|---|---|
| JP | 06-351229 | 12/1994 |
| JP | 08-088967 | 4/1996 |
| JP | 08-103070 | 4/1996 |
| JP | 08-331840 | 12/1996 |
| JP | 2001-211636 | 8/2001 |
| JP | 2001-339938 A | 12/2001 |
| JP | 2002-119098 A | 4/2002 |
| JP | 2003-045193 | 2/2003 |
| JP | 2003-234408 | 8/2003 |
| JP | 2004-248451 | 9/2004 |
| JP | 2004-341574 | 12/2004 |
| JP | 2004-343441 | 12/2004 |

\* cited by examiner

STEP-UP CIRCUIT AND PORTABLE DEVICE USING IT

TECHNICAL FIELD

The present invention relates to step-up circuits that step up a power supply voltage and output a given high voltage, and to portable devices using such step-up circuits.

BACKGROUND ART

Conventionally, charge-pump step-up circuits have been often used as power supply circuits for obtaining, from a power supply voltage, an output voltage that is higher than the power supply voltage. Typically, such a charge-pump step-up circuit is configured as follows. A plurality of stages of charge pump units, each being composed of a flying capacitor and a switch, are sequentially connected so as to obtain an output voltage by stepping up an input voltage to a predetermined level (see Patent Document 1).

In the charge-pump step-up circuit described above, to obtain an output voltage at a predetermined level, stepping-up operation performed thereby has to be controlled according to its output voltage. As an example of a conventional technology related to what has been described thus far, Patent Document 2 discloses a stepping-up operation control method by which an output voltage of the step-up circuit is detected, and, according to the output voltage thus detected, the conductivity of a MOS transistor provided in the step-up circuit is controlled.

Patent Document 1: JP-A-2003-234408
Patent Document 2: JP-A-H06-351229

DISCLOSURE OF THE INVENTION

Problems to be Solved by the Invention

For the charge-pump step-up circuit described above, there has been a charge-pump step-up circuit of a serial-parallel switching type as well as a Dickson-type charge-pump step-up circuit such as the one described in Patent Document 1. In either type of charge-pump step-up circuit, the level of the output voltage is determined according to a power supply voltage inputted thereto and the number of step-up stages.

Thus, to obtain a specific output voltage by stepping up an input voltage by a predetermined factor, there needs to be the same number of stages of charge pump units as the predetermined factor. That is, there also needs to be the same number of flying capacitors as the predetermined factor.

In a case where the charge pump circuit described above is incorporated in an IC, the flying capacitors provided therein occupy a large space. This leads to an undesirable increase in the IC size, and thus leads to accordingly higher cost. Furthermore, in a case where the flying capacitors are externally fitted to the IC, a large number of chip capacitors have to be externally fitted thereto. As a result, problems arise, such as an increased footprint on a circuit board and increased time labor required for mounting.

On the other hand, in terms of an output voltage control method, the charge-pump step-up circuit disclosed in Patent Document 2 stabilizes an output voltage by changing the ON resistance of a detector MOS transistor according to the output voltage. The problem is, however, that the ON resistance sharply changes around a threshold voltage. This makes it difficult to make an adjustment so as to obtain a stable output voltage.

Incidentally, in the charge-pump step-up circuit disclosed in Patent Document 2, the gate voltage of a switching MOS transistor of the charge pump unit is adjusted. However, the resistance of a voltage divider resistor for producing the gate voltage and the floating capacitance of the switching MOS transistor make the rising edge of the gate voltage less steep, producing a delay in the switching operation of the switching MOS transistor. To minimize such a delay, the resistance of the voltage divider resistor, for example, may be reduced. However, this undesirably reduces the efficiency of the step-up circuit.

Furthermore, in the charge-pump step-up circuit disclosed in Patent Document 2, a capacitor of the charge pump unit is charged during start-up. This undesirably causes the flow of a large inrush current.

Therefore, a first object of the present invention is to provide step-up circuits that can output an output voltage at a predetermined level obtained by stepping up an input voltage by a predetermined factor by using a smaller number of stages of step-up units such as charge pump units, and to provide portable devices using such step-up circuits.

A second object of the present invention is to provide step-up circuits that can provide stable output of an output voltage at a predetermined level and can reduce an inrush current during start-up to a predetermined current level, and to provide portable devices using such step-up circuits.

To achieve the first object, according to a first aspect of the present invention, a step-up circuit includes sequentially connected first- to final-stage step-up units, the first-stage step-up unit to which an input voltage is inputted and the final-stage step-up unit from which a stepped-up output voltage is outputted. Here, the step-up units each comprise: first and second input nodes; a capacitor; a first switch connected between one end of the capacitor and the first input node; an output node connected to the one end of the capacitor and to a first input node of a following-stage step-up unit; a second switch connected between the other end of the capacitor and the second input node; and a third switch connected between the other end of the capacitor and a reference potential point. In an odd-stage step-up unit including the first-stage step-up unit, the first switch and the third switch are turned on/off according to a first clock, and the second switch is turned on/off according to a second clock that is nearly opposite in phase to the first clock. In an even-stage step-up unit, the first switch and the third switch are turned on/off according to the second clock, and the second switch is turned on/off according to the first clock. The second input node of a certain step-up unit is connected to the first input node of a step-up unit in a stage preceding that certain step-up unit so that stepping-up operation can be performed, and the second input node of a step-up unit other than the certain step-up unit is connected to a predetermined potential point (a first configuration).

Preferably, in the step-up circuit having the first configuration described above, the first input node and the second input node of the first-stage step-up unit and the second input node of the second-stage step-up unit are connected to an input voltage point, and the second input node of a certain odd-stage step-up unit other than the first-stage step-up unit is connected to the output node of an odd-stage step-up unit in a stage preceding the certain odd-stage step-up unit (a second configuration).

Preferably, in the step-up circuit having the second configuration described above, the second input node of a certain even-stage step-up unit other than the second-stage step-up unit is connected to the output node of an even-stage step-up unit in a stage preceding the certain even-stage step-up unit (a third configuration).

Preferably, in the step-up circuit having the first configuration described above, the reference potential point is a potential point of the input voltage, the predetermined potential point is a ground potential point, and an output voltage that is a negative voltage obtained by stepping up the input voltage so as to be greater than the input voltage in absolute value is outputted from the final-stage step-up unit (a fourth configuration).

Preferably, in the step-up circuit having the first configuration described above, the first-stage step-up unit is a constant-current operated step-up unit having first and second input nodes to which an input constant current is inputted from an input potential point so that stepping-up operation is performed by the input constant current (a fifth configuration).

Preferably, in the step-up circuit having the fifth configuration described above, the second input node of a certain odd-stage step-up unit other than the first-stage step-up unit is connected to the output node of an odd-stage step-up unit in a stage preceding the certain odd-stage step-up unit (a sixth configuration).

Preferably, in the step-up circuit having the sixth configuration described above, the second input node of a certain even-stage step-up unit other than the second-stage step-up unit is connected to the output node of an even-stage step-up unit in a stage preceding the certain even-stage step-up unit (a seventh configuration).

Preferably, in the step-up circuit having the fifth configuration described above, a current mirror circuit is further provided that amplifies a reference constant current by a predetermined factor of N (N>1) and passes the input constant current from an constant-current output node to the first-stage step-up unit (an eighth configuration).

To achieve the second object, according to a second aspect of the present invention, a step-up circuit that steps up an input voltage and outputs an output voltage is provided with: a constant-current control circuit that produces a first reference current as a reference constant current when a first detection voltage according to the output voltage is lower than a reference voltage, and that stops the reference constant current when the first detection voltage exceeds the reference voltage; and at least one constant-current operated step-up unit in which stepping-up operation is performed by an input constant current according to the reference constant current (a ninth configuration).

Preferably, in the step-up circuit having the ninth configuration, the constant-current control circuit includes a first differential amplifier circuit to which the first detection voltage and the reference voltage are inputted, the first differential amplifier circuit performing differential amplification on the first detection voltage and the reference voltage inputted thereto. Based on operation of the first differential amplifier circuit, the constant-current control circuit determines whether to produce or stop the reference constant current (a tenth configuration).

Preferably, in the step-up circuit having the tenth configuration described above, the constant-current control circuit further produces, as the reference constant current, a second reference current that is smaller than the first reference current when a second detection voltage according to the output voltage, the second detection voltage that is higher than the first detection voltage, is lower than the reference voltage, and that produces the first reference current when the second detection voltage exceeds the reference voltage (an eleventh configuration).

Preferably, in the step-up circuit having the eleventh configuration described above, the constant-current control circuit includes: a first differential amplifier circuit to which the first detection voltage and the reference voltage are inputted, the first differential amplifier circuit performing differential amplification on the first detection voltage and the reference voltage inputted thereto; and a second differential amplifier circuit to which the second detection voltage and the reference voltage are inputted, the second differential amplifier circuit performing differential amplification on the second detection voltage and the reference voltage inputted thereto. Based on operation of the first and second differential amplifier circuits, the constant-current control circuit determines whether to produce, as the reference constant current, one of the first and second reference currents or stop the reference constant current (a twelfth configuration).

Alternatively, in the step-up circuit having the ninth configuration described above, the constant-current control circuit may start operating in response to an operation signal inputted thereto, and produce, as the reference constant current, a second reference current that is smaller than the first reference current until a predetermined time period elapses after the operation signal is inputted, and produce the first reference current when the predetermined time period has elapsed (a thirteenth configuration).

Preferably, in the step-up circuit having the thirteenth configuration described above, the constant-current control circuit includes: a first differential amplifier circuit to which the first detection voltage and the reference voltage are inputted, the first differential amplifier circuit performing differential amplification on the first detection voltage and the reference voltage inputted thereto; a timer circuit that counts the predetermined time period in response to the operation signal inputted thereto; and a second differential amplifier circuit to which an output of the timer circuit and the reference voltage are inputted, the second differential amplifier circuit performing differential amplification on the output of the timer circuit and the reference voltage inputted thereto. Based on operation of the first and second differential amplifier circuits, the constant-current control circuit determines whether to produce, as the reference constant current, one of the first and second reference currents or stop the reference constant current (a fourteenth configuration).

Preferably, in the step-up circuit having the ninth configuration described above, a current mirror circuit is further provided that amplifies the reference constant current by a predetermined factor of N (N>1) and passes the input constant current from an constant-current output node to the constant-current operated step-up unit (a fifteenth configuration).

Preferably, in the step-up circuit having the fifteenth configuration described above, the constant-current operated step-up unit includes: a capacitor; a first switch connected between the constant-current output node and one end of the capacitor, the first switch being turned on/off according to a first clock; a third switch connected between the other end of the capacitor and a reference potential point, the third switch being turned on/off according to the first clock; and a second switch connected between the constant-current output node and the other end of the capacitor, the second switch being turned on/off according to a second clock that is nearly opposite in phase to the first clock (a sixteenth configuration).

Alternatively, in the step-up circuit having the fifteenth configuration described above, the constant-current operated step-up unit may include: a capacitor; a first switch connected between an input voltage point or an output node of a step-up unit in a preceding stage and one end of the capacitor, the first switch being turned on/off according to a first clock; third switch means connected between the other end of the capacitor and a reference potential point, the third switch means being turned on/off according to the first clock; and a second switch connected between the constant-current output node and the other end of the capacitor, the second switch being turned on/off according to a second clock that is nearly opposite in phase to the first clock (a seventeenth configuration).

According to a third aspect of the present invention, a portable device is provided with: a battery power supply that outputs an input voltage; the step-up circuit having one of the first to seventeenth configurations, the step-up circuit to which the input voltage is inputted; and a load to which an output voltage from the step-up circuit is supplied (an eighteenth configuration).

EFFECT OF THE INVENTION

According to the present invention, in a step-up circuit in which an input voltage Vcc is inputted to a first-stage step-up unit and an output voltage Vout is outputted from a final-stage step-up unit, by inputting, to a certain step-up unit, a voltage stepped up by a step-up unit in a stage preceding that certain step-up unit instead of the input voltage, it is possible to increase the level of a voltage stepped up by each step-up unit. This reduces the number of step-up units needed to obtain a required output voltage Vout as compared with the conventional configuration, making it possible to reduce the number of flying capacitors. Thus, in a case where the step-up circuit described above is incorporated in an IC, it is possible to achieve miniaturization of the IC. Furthermore, in a case where the flying capacitor is externally fitted to the IC, since the number of chip capacitors externally fitted is reduced, it is possible to reduce the footprint on a circuit board, and thereby reduce time and labor required for mounting.

By using a step-up unit of a constant-current operated type in which stepping-up operation is performed by an input constant current as a first-stage step-up unit, an input constant current Is1 is supplied to the step-up unit. This helps limit an inrush current during start-up. This reduces the burden on a power supply such as a battery, and helps reduce a variation in the power supply voltage.

According to the present invention, when an output voltage Vout of a step-up circuit such as a charge-pump step-up circuit is lower than a given voltage Vo1, stepping-up operation is performed by a given input constant current Is1; when the output voltage Vout exceeds the given voltage Vo1, the input constant current Is1 is stopped. As a result, stepping-up operation is performed by a given input constant current, making it possible to provide stable output of an output voltage at a predetermined level.

Since the input constant current Is1 is supplied to a step-up unit such as a charge pump unit, no inrush current is generated during start-up. This reduces the burden on a power supply such as a battery, and helps reduce a variation in the power supply voltage.

By adopting a configuration in which automatic switching is performed in such a way that, when an output voltage Vout is low, a smaller input constant current Is2 is supplied; when the output voltage Vout has reached a predetermined level, a larger input constant current Is1 is supplied, a current is made to gradually increase. This further reduces the burden on a power supply such as a battery.

By adopting a configuration in which a smaller constant current is supplied for a predetermined time period during start-up of a step-up circuit such as a charge-pump step-up circuit, and then a predetermined larger input constant current is supplied, although the time that the output voltage Vout takes to reach a predetermined level Vo1 is lengthened, it is possible to further reduce the burden on a battery power supply. Furthermore, due to a high current supply capability during normal operation, it is possible to enhance the response to a variation in the output voltage.

In a case where a step-up circuit includes a plurality of stages of step-up units, by using, as at least one of them, a step-up unit of a constant current-operated type, it is possible to perform constant-voltage control.

Figure 1:
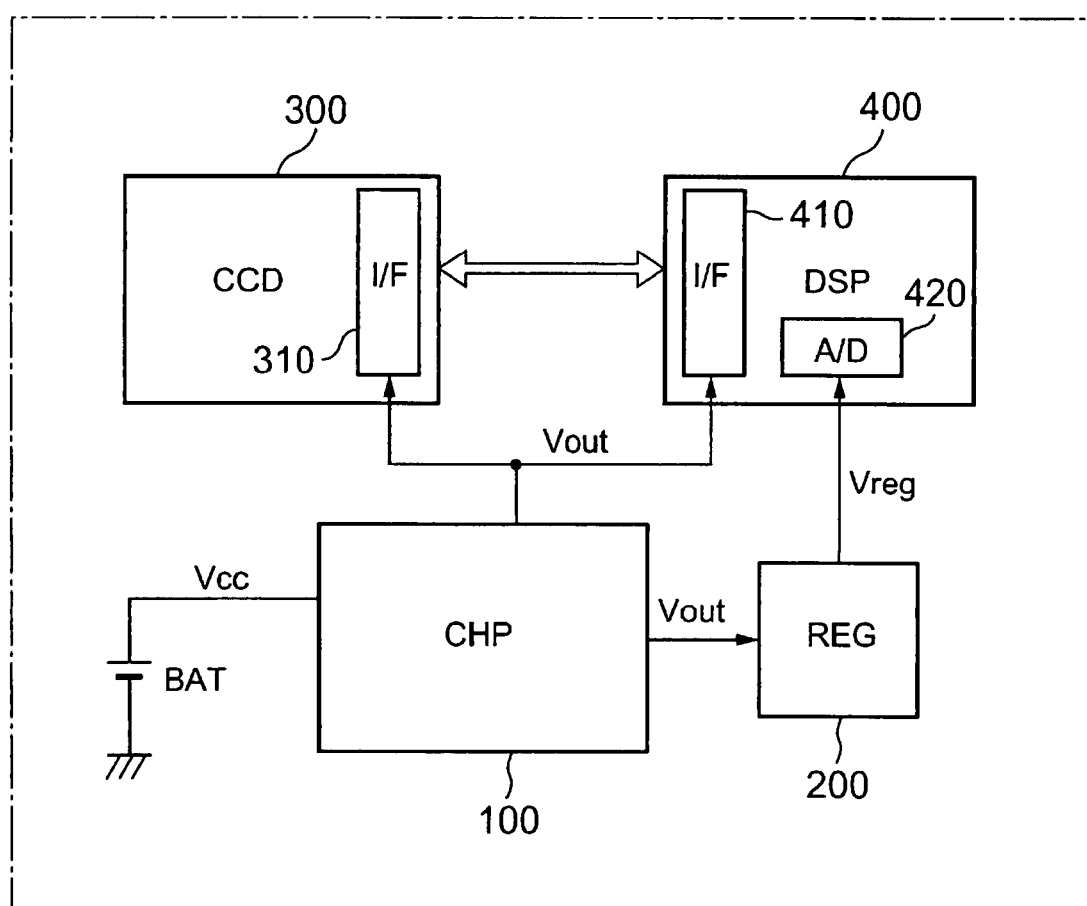
[FIG. 1] A diagram showing the schematic configuration of a portable device using a charge-pump step-up circuit according to the invention.

LIST OF REFERENCE SYMBOLS 100, 100A to 100J Charge-pump step-up circuit
BAT Battery power supply
10 Current mirror circuit
11, 12 PMOS
20 Constant-current control circuit
21, 22, 23 Voltage divider resistor
24 Differential amplifier circuit
26 Variable constant-current source circuit
30, 40, 50, 60 Charge pump unit
SA11 to SA42, SB11 to SB42 Switch
C1, C2, C3, C4 Flying capacitor
Co Output capacitor
Vcc Input voltage
Vout Output voltage
Vreg Regulated voltage
Vref Reference voltage
Vdet1 First detection voltage Vdet2 Second detection voltage
Io Output current
Iref Reference constant current
Ir1 First reference current
Ir2 Second reference current
Isink Input constant current
Is1 First input constant current
Is2 Second input constant current
CLK1, CLK2 Clock
ST Operation signal

BEST MODE FOR CARRYING OUT THE INVENTION

Hereinafter, a step-up circuit embodying the present invention and a portable device using it will be described with reference to the drawings.

FIG. 1 is a diagram showing the schematic configuration of a portable device using a charge-pump step-up circuit according to the invention.

In FIG. 1, a charge-pump step-up circuit 100 receives an input voltage Vcc from a battery power supply BAT, and steps up the input voltage Vcc so as to obtain an output voltage Vout at a predetermined level.

The output voltage Vout is supplied, as an operating voltage, to a load device such as an imaging circuit 300 using a CCD (charge-coupled device) and the like and a digital signal processor 400. In this example, the output voltage Vout is supplied to an interface circuit 310 of the imaging circuit 300 and to an interface circuit 410 of the digital signal processor 400. This, however, is merely an example of how the invention can be implemented, and is not meant to limit the application of the invention in any way.

To a load device, such as an analog/digital converter 420 provided in the digital signal processor 400, that requires a voltage different from the output voltage Vout, a regulated voltage Vreg, or the output voltage Vout regulated by a regulator 200, is supplied.

Figure 2:
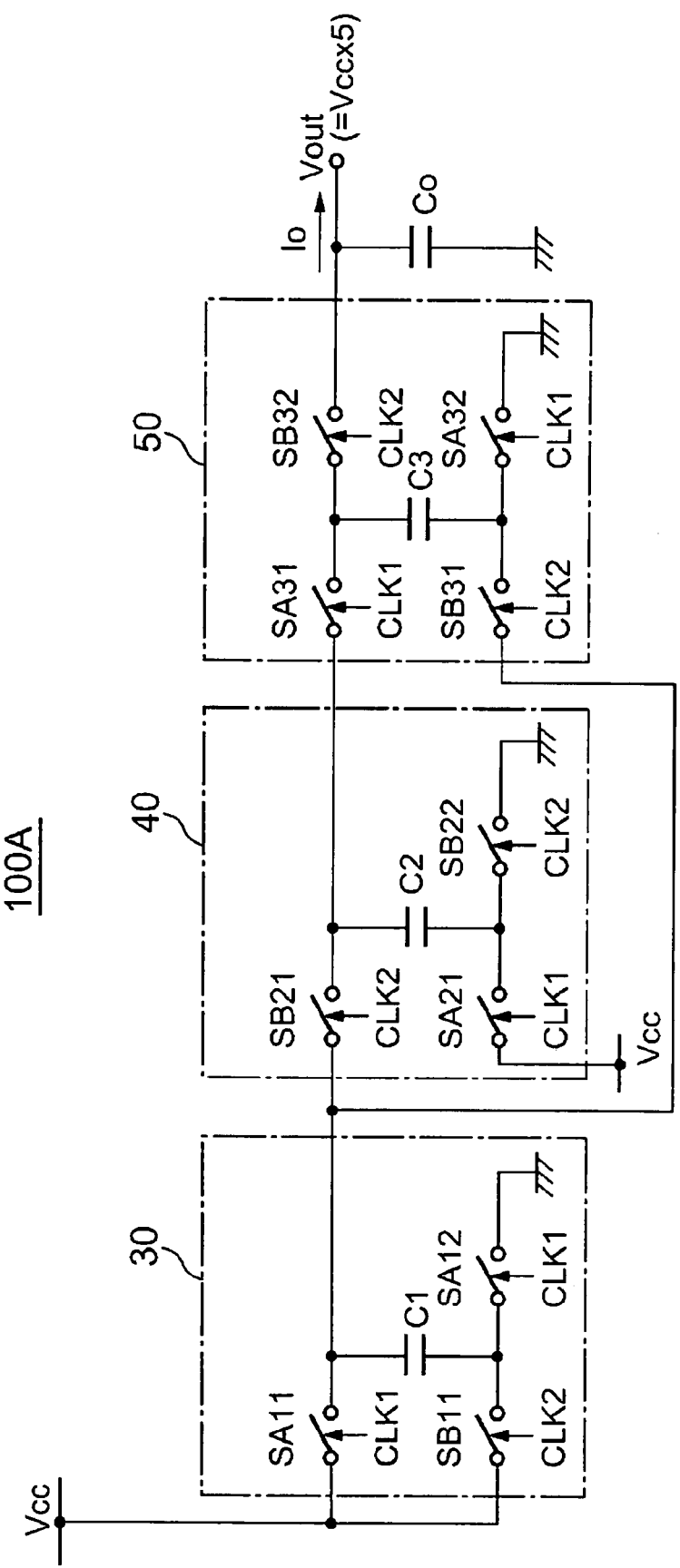
[FIG. 2] A diagram showing a step-up circuit 100A of a first embodiment.

FIG. 2 is a diagram showing a first embodiment of the step-up circuit 100 (hereinafter a step-up circuit 100A). In FIG. 2, as an example of implementation, a description will be given of the configuration in which an output voltage Vout obtained by stepping up the input voltage Vcc by a factor of 5 is produced.

Figure 3:
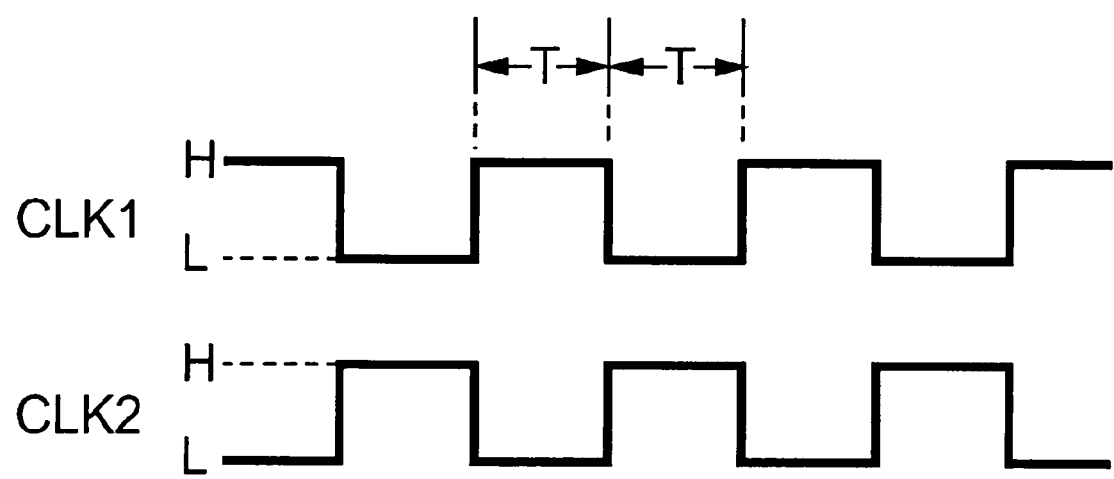
[FIG. 3] A diagram showing the timing of clocks used in the first embodiment.

FIG. 3 is a diagram showing the timing of clocks used in the step-up circuit 100A. It is to be noted that the timing of clocks CLK1 and CLK2 shown in this figure applies also to the other embodiments described later.

As shown in FIG. 2, the step-up circuit 100A of this embodiment includes, as step-up units thereof, sequentially connected first- to third-stage charge pump units 30 to 50.

The charge pump units 30, 40, and 50 have basically the same configuration. Now, as an example of such a configuration, the specific configuration of the first-stage charge pump unit 30 will be described. The first-stage charge pump unit 30 includes a flying capacitor C1, a first switch SA11 connected between one end of the capacitor C1 and a first input node, an output node that is connected to the one end of the capacitor C1 and to a first input node of the following-stage charge pump unit 40, a second switch SB11 connected between the other end of the capacitor C1 and a second input node, and a third switch SA12 connected between the other end of the capacitor C1 and a ground that serves as a reference potential point.

In the second-stage charge pump unit 40 and the final-stage charge pump unit 50, reference characters of the capacitors are C2 and C3, respectively, and reference characters of the first to third switches are SB21, SA21, and SB22, and SA31, SB31, and SA32, respectively.

The final-stage charge pump unit 50 further includes a fourth switch SB32 that is connected between one end of the capacitor C3 and an output voltage point and is turned on/off according to the second clock CLK2. The fourth switch SB32 prevents backflow from an output capacitor Co. Thus, the fourth switch is provided only in the final-stage charge pump unit. In other words, the fourth switch simply has to be provided on the input side of the output capacitor Co outside the final-stage charge pump unit.

In the odd-stage charge pump units 30 and 50 including the first-stage charge pump unit, the first switches SA11 and SA31 and the third switches SA12 and SA32 are turned on/off according to the first clock CLK1, and the second switches SB11 and SB31 are turned on/off according to the second clock CLK2 that is nearly opposite in phase to the first clock. On the other hand, in the even-stage charge pump unit 40, the first switch SB21 and the third switch SB22 are turned on/off according to the second clock CLK2, and the second switch SA21 is turned on/off according to the first clock CLK1.

As shown in FIG. 3, the first clock CLK1 and the second clock CLK2 are two-phase clocks and are generated so as to be nearly opposite in phase. Alternatively, they may be clocks generated so that there is no period in which they both are on.

The first input node and the second input node of the first-stage charge pump unit 30 and the second input node of the second-stage charge pump unit 40 are connected to an input voltage point, through which the input voltage Vcc is inputted. A second input node of a certain odd-stage charge pump unit (in this figure, the final-stage charge pump unit 50) other than the first-stage charge pump unit 30 is connected to an output node of an odd-stage charge pump unit (in this figure, the first-stage charge pump unit 30) in a stage preceding the certain odd-stage charge pump unit. Thus, the output node of the charge pump unit 30 is connected to the first input node of the following-stage charge pump unit 40 and to the second input node of the final-stage charge pump unit 50.

In a case where four or more charge pump units are connected sequentially, a second input node of a certain even-stage charge pump unit (such a charge pump unit is not present in FIG. 2, because there are only three charge pump units) other than the second-stage charge pump unit 40 is connected to the output node of an even-stage charge pump unit in a stage preceding the certain even-stage charge pump unit. Thus, the output node of the charge pump unit 40 is connected to the first input node of the following-stage charge pump unit 50 and to a second input node of a fourth-stage charge pump unit (if any).

Since the second input node of the charge pump unit 50 is connected to the output node of the charge pump unit 30, a voltage at this output node, i.e., "2×Vcc" is used by the charge pump unit 50 for stepping-up operation. In this way, it is possible to obtain a stepped-up voltage "Vcc×5" as an output voltage Vout by using four capacitors: the flying capacitors C1 to C3 and the output capacitor Co. Thus, with the configuration of the first embodiment of the present invention, it is possible to produce a required voltage with a smaller number of capacitors than in the conventional charge-pump step-up circuit in which five capacitors are needed for producing it.

The output capacitor Co connected to the output voltage point of the step-up circuit 100A is charged to the output voltage Vout. The resultant output voltage Vout is outputted to the load as an operating voltage, and an output current Io that meets the needs of the load is outputted.

In the first embodiment described above, the charges stored in the capacitor C1 of the charge pump unit 30 are fed to the charge pump unit 40 and to the charge pump unit 50. Thus, it is preferable that the capacitance of the capacitor C1 be made greater than the capacitances of the capacitors C2 and C3. That is, preferably, used as a capacitor (for example, C1) that feeds the charges stored therein to a plurality of charge pump units is a capacitor having a capacitance greater than those of the other capacitors (for example, C2 and C3). The same is true with the other embodiments described later.

Figure 4:
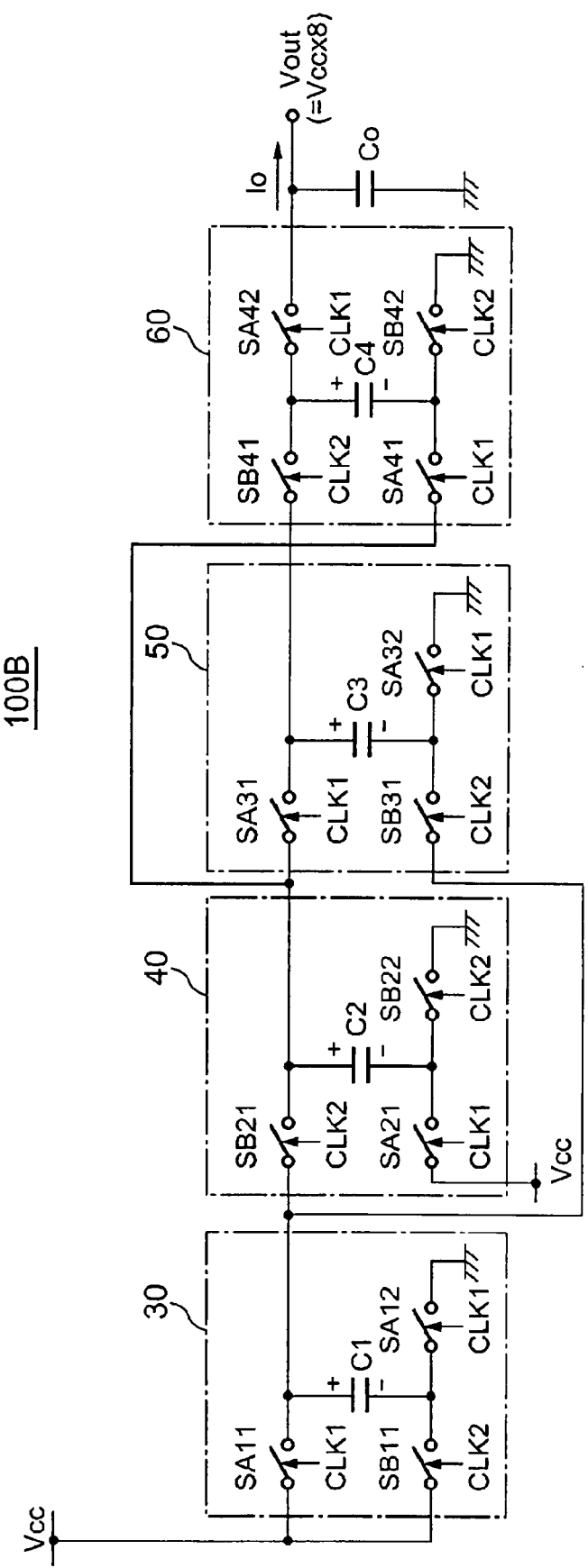
[FIG. 4] A diagram showing a step-up circuit 100B of a second embodiment.

FIG. 4 is a diagram showing a second embodiment of the step-up circuit 100 (hereinafter a step-up circuit 100B). In FIG. 4, as an example of implementation, a description will be given of the configuration in which an output voltage Vout obtained by stepping up the input voltage Vcc by a factor of 8 is produced.

As shown in FIG. 4, the step-up circuit 100B of this embodiment includes, as step-up units thereof, four sequentially connected charge pump units 30 to 60. Although the number of sequentially connected charge pump units is increased, the basic configuration of the second embodiment shown in FIG. 4 is similar to that of the first embodiment described above.

In FIG. 4, the charge pump unit 60 is a final-stage unit. Thus, a fourth switch SA42 that is connected between one end of a capacitor C4 and an output voltage point and is turned on/off according to the first clock CLK1 is provided in the charge pump unit 60. In the final-stage charge pump unit 60, reference character of the capacitor is C4, and reference characters of the first to third switches are SB41, SA41, and SB42.

In this example, since four charge pump units are connected sequentially, a second input node of the fourth-stage charge pump unit 60, which is an even-stage charge pump unit other than the second-stage charge pump unit 40, is connected to the output node of the charge pump unit 40, which is an even-stage charge pump unit in a stage preceding the charge pump unit 60.

In FIG. 4, since the second input node of the charge pump unit 50 is connected to the output node of the charge pump unit 30, a voltage at this output node, i.e., "2×Vcc" is used by the charge pump unit 50 for stepping-up operation. Thus, from the output node of the charge pump unit 50, a stepped-up voltage "5×Vcc" obtained by stepping up the input voltage Vcc by a factor of 5 is outputted.

Furthermore, since the second input node of the charge pump unit 60 is connected to the output node of the charge pump unit 40, a voltage at this output node, i.e., "3×Vcc" is used by the charge pump unit 60 for stepping-up operation. Thus, from the output node of the charge pump unit 60, a stepped-up voltage "8×Vcc" obtained by stepping up the input voltage Vcc by a factor of 8 is outputted.

In this way, it is possible to obtain a stepped-up voltage "Vcc×8" as an output voltage Vout by using five capacitors: the flying capacitors C1 to C4 and the output capacitor Co. Thus, with the configuration of the second embodiment of the present invention, it is possible to produce a required high voltage by stepping-up by a factor of 8 with a further smaller number of capacitors than in the conventional charge-pump step-up circuit in which eight capacitors are needed for producing it.

As described above, in the first and second embodiments of the present invention, the second input node of a certain charge pump unit 50 or 60 is connected to the output node of a charge pump unit 30 or 40 in a stage preceding that certain charge pump unit so that stepping-up operation can be performed, and the second input node of a charge pump unit 30 or 40 other than that certain charge pump unit is connected to a predetermined potential point (e.g., an input potential point).

That is, to the certain charge pump unit 50 or 60, instead of the input voltage Vcc, a stepped-up voltage outputted from the charge pump unit 30 or 40 in a stage preceding the certain charge pump unit is inputted, so that the level of a voltage stepped up by each charge pump unit is increased. This configuration, as compared with the conventional one, reduces the number of charge pump units needed to obtain a required output voltage Vout. Accordingly, it is possible to reduce the number of flying capacitors.

Thus, in a case where the step-up circuit 100B described above is incorporated in an IC, it is possible to achieve miniaturization of the IC. Furthermore, in a case where the flying capacitors C1 to C4 are externally fitted to the IC, since the number of chip capacitors externally fitted is reduced, it is possible to reduce the footprint on a circuit board, and thereby reduce time and labor required for mounting.

Figure 5:
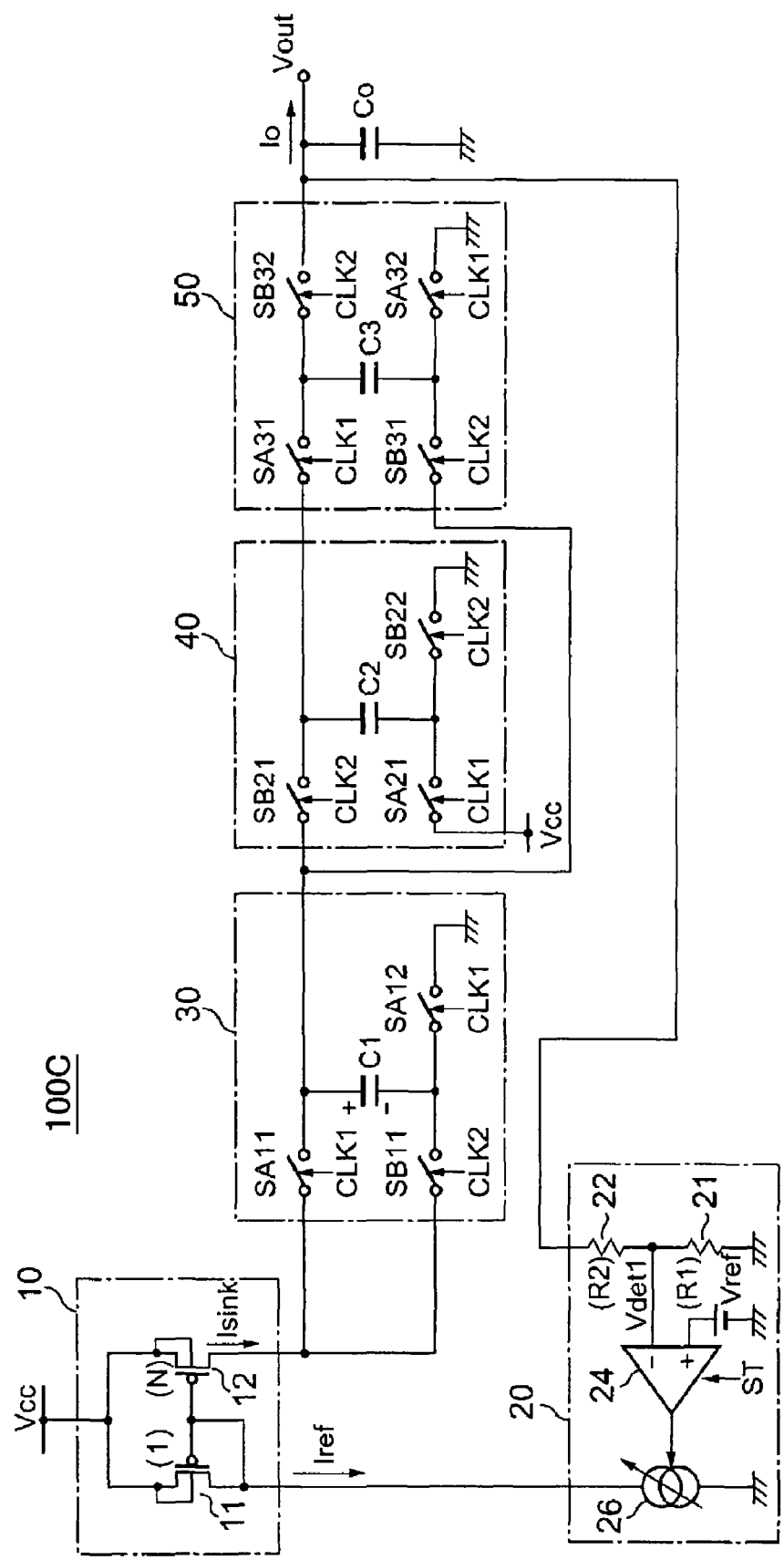
[FIG. 5] A diagram showing a step-up circuit 100C of a third embodiment.

FIG. 5 is a diagram showing a third embodiment of the step-up circuit 100 (hereinafter a step-up circuit 100C). As shown in this figure, the step-up circuit 100C differs from the first embodiment shown in FIG. 2 in that the first-stage charge pump unit 30 is replaced with a current-operated charge pump unit 30. In addition, the step-up circuit 100C has a configuration in which the output voltage Vout is so controlled as to be a predetermined constant voltage. Note that the charge pump units 40 and 50 are similar to those shown in FIG. 2.

In FIG. 5, a current mirror circuit 10 includes a P-type MOS transistor (hereinafter a PMOS) 11 whose gate and drain are connected together and a PMOS 12 whose gate is connected to the gate of the PMOS 11. The current mirror ratio between the PMOS 11 and the PMOS 12 is 1:N. This current mirror ratio can be any given value; for example, it may be from several tens to several hundreds.

When a reference constant current Iref flows through the PMOS 11, an input constant current Isink that is N times greater than the reference constant current Iref can flow through the PMOS 12.

This input constant current Isink is supplied to the current-operated charge pump unit 30 that serves as the first-stage charge pump unit. In the current-operated charge pump unit 30, stepping-up operation is performed by using the input constant current Isink, and the resultant stepped-up voltage is outputted from the output node thereof to the first input node of the charge pump unit 40 and to the second input node of the charge pump unit 50.

The output capacitor Co connected to the output voltage point of the step-up circuit 100C is charged to the output voltage Vout. The resultant output voltage Vout is outputted to the load as an operating voltage, and an output current Io that meets the needs of the load is outputted.

To the first and second input nodes of the current-operated charge pump unit 30, the input constant current Isink from the constant-current output node of the current mirror circuit 10 is inputted.

In a constant-current control circuit 20, the output voltage Vout is divided by a resistor 21 (having a resistance R1) and a resistor 22 (having a resistance R2), so that a first detection voltage Vdet1 according to the output voltage Vout is obtained. A differential amplifier circuit 24 receives the first detection voltage Vdet1 and a reference voltage Vref as two inputs, and operates when an operation signal ST is inputted thereto. The differential amplifier circuit 24 performs differential amplification on the two inputs thus received, and produces differential output. The differential amplifier circuit 24 may be configured as a comparator circuit. Although the description heretofore deals with a case in which the operation signal ST is inputted to the differential amplifier circuit 24, the operation signal ST simply has to be inputted to the constant-current control circuit 20 so that operation of the constant-current control circuit 20 is controlled according to the operation signal ST.

According to the output of the differential amplifier circuit 24, a current value of a variable constant-current source circuit 26, namely the reference constant current Iref, is adjusted. When the first detection voltage Vdet1 is lower than the reference voltage Vref, the variable constant-current source circuit 26 produces a first reference current Ir1 as the reference constant current Iref. As the first detection voltage Vdet1 gets closer to the reference voltage Vref, the reference constant current Iref decreases. When the first detection voltage Vdet1 exceeds the reference voltage Vref, the reference constant current Iref is stopped. In this way, the constant-current control circuit 20 adjusts the reference constant current Iref according to the level of the first detection voltage Vdet1, namely the output voltage Vout.

Figure 6:
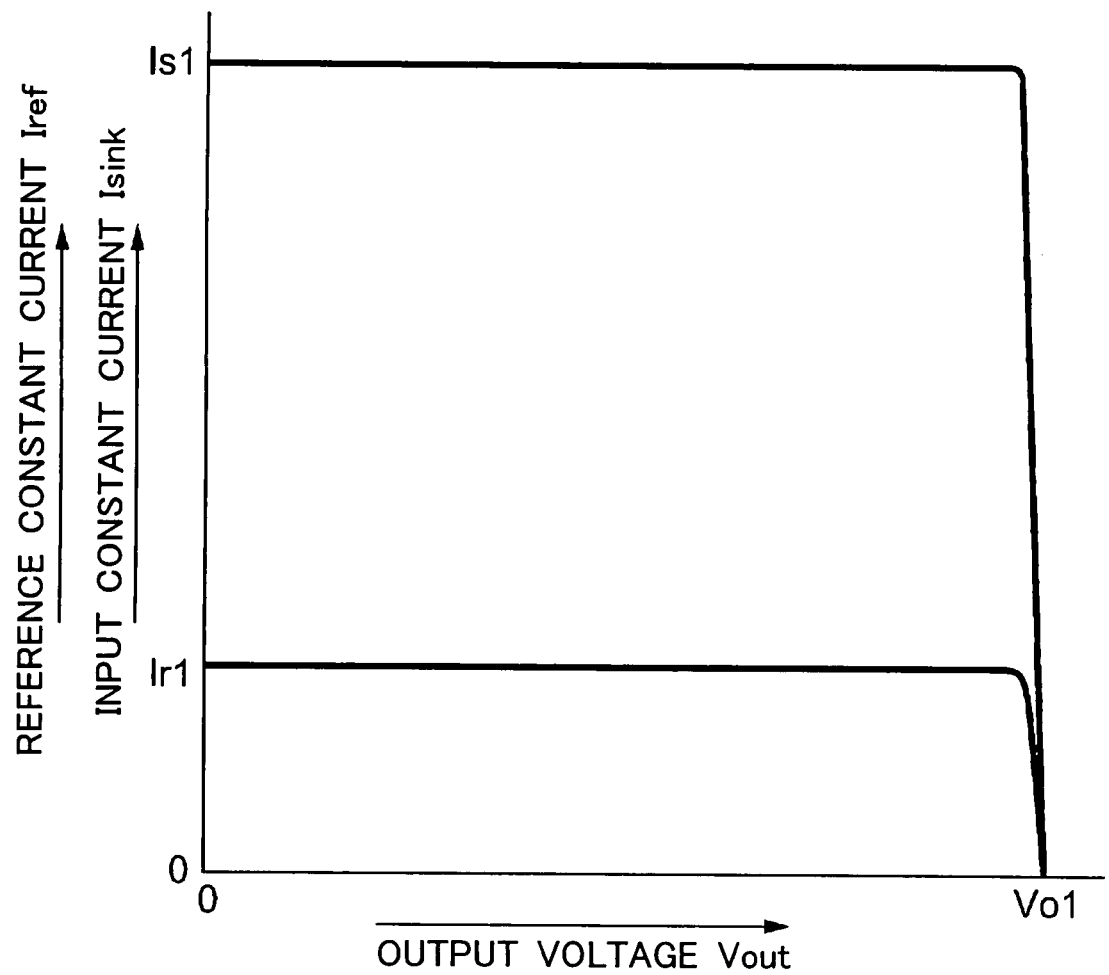
[FIG. 6] A diagram showing the output voltage-input constant current characteristics of the step-up circuit 100C of the third embodiment.

Operation of the charge pump circuit 100C of the third embodiment will be described with reference also to FIG. 6 showing the output voltage Vout-input constant current Isink characteristics.

Consider a case where the step-up circuit 100C is operated from a state in which the output voltage Vout is zero. When the operation signal ST is produced, the constant-current control circuit 20 starts operating. At the same time, an unillustrated clock generator starts operating and generates the first and second clocks CLK1 and CLK2.

When the constant-current control circuit 20 starts operating, the differential amplifier circuit 24 performs differential amplification on the first detection voltage Vdet1 and the reference voltage Vref. Since the first detection voltage Vdet1 is lower than the reference voltage Vref at the start of operation, a large differential output is produced by the differential amplifier circuit 24. In response to this, the variable constant-current source circuit 26 produces a given first reference current Ir1 as the reference constant current Iref.

In the current mirror circuit 10, a first input constant current Is1 obtained by amplifying the first reference current Ir1 by a factor of N corresponding to the current mirror ratio is produced. The first input constant current Is1 thus obtained is outputted from the current mirror circuit 10 to the charge pump unit 30.

In the charge pump unit 30, the first and third switches SA11 and SA12 are turned on/off according to the first clock CLK1, and the second switch SB11 is turned on/off according to the second clock CLK2. The first and third switches SA11 and SA 12 and the second switch SB11 are turned on/off in such a way that the former is on when the latter is off and vice versa.

When the first and third switches SA11 and SA12 are on, only during that on period T, the capacitor C1 is charged by a constant current, i.e., the first input constant current Is1 that flows along a first path from the first switch SA 11 to the third switch SA12 via the capacitor C1, so as to have the polarity shown in the figure. At this point, the charging voltage of the capacitor C1 equals "the first input constant current Is1× on period T/the capacitance of the capacitor C1".

On the other hand, when the second switch SB11 is on, stepping-up operation is performed by a constant current, i.e., the first input constant current Is1 passing along a second path from the second switch SB11 to the output node via the capacitor C1, so that the capacitor C1 is charged so as to have the polarity shown in the figure.

In this case, unlike the conventional configuration, since the first input constant current Is1 is supplied to the charge pump unit 30, no inrush current is generated even during start-up. This reduces the burden on a power supply such as a battery power supply BAT, and helps reduce a variation in the power supply voltage Vcc.

Charging by a constant current flowing through the first path and stepping-up by a constant current flowing through the second path are repeatedly performed according to the first and second clocks CLK1 and CLK2. The output voltage Vout gradually increases while passing through the charge pump units 40 and 50 where further stepping-up is performed thereto.

Charging and stepping-up by a constant current performed in the charge pump unit 30 are performed by the first input constant current Is1. Thus, unlike the conventional configuration, the charging speed and stepping-up speed do not decrease even when the output voltage Vout becomes considerably high.

As the output voltage Vout gets closer to a target voltage, namely a first output voltage Vo1, the differential output of the differential amplifier circuit 24 becomes smaller, and accordingly the reference constant current Iref decreases from the first reference current Ir1 toward zero. When the output voltage Vout has reached or exceeded the first output voltage Vo1, the differential output of the differential amplifier circuit 24 becomes zero or negative, and accordingly the reference constant current Iref becomes zero. As a result, the input constant current Isink becomes zero, and accordingly the stepping-up operation of the step-up circuit 100C is suspended.

Since the operation signal ST is continuously produced even in this suspended state, the constant-current control circuit 20 is still operating. Moreover, since the first and second clocks CLK1 and CLK2 are also continuously produced, the switches are repeatedly turned on/off.

Thus, when the output voltage Vout has decreased below the first output voltage Vo1 as a result of the output current Io being supplied to the load, the stepping-up operation of the step-up circuit 100C is immediately resumed.

As described above, in the step-up circuit 100C, the stepping-up operation is performed by a given input constant current in such a way that it is repeatedly suspended and resumed so as to maintain the output voltage Vout at a level close to the first output voltage Vo1.

It is to be noted that the frequency with which the stepping-up operation is suspended and resumed may be reduced by giving hysteresis to the differential amplifier circuit 24.

Although FIG. 5 shows the configuration in which the output voltage Vout is so controlled as to be a constant voltage, a configuration in which such constant-voltage control is not performed may be adopted. In that case, it is necessary simply to pass the reference constant current Iref or stop passing it. Specifically, for example, it is necessary simply to turn on or off the operation of the variable constant-current source circuit 26 by using the operation signal ST.

Figure 7:
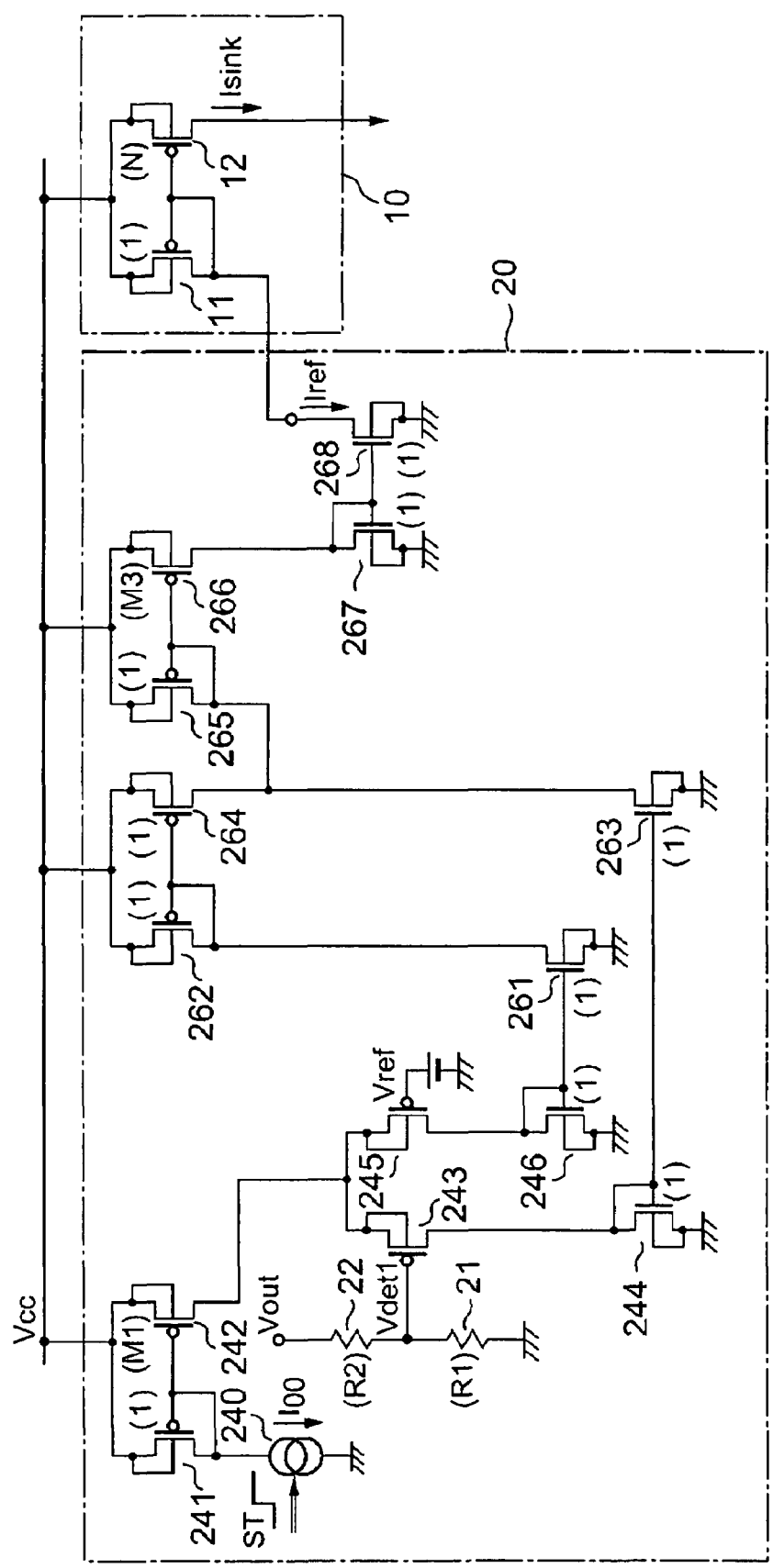
[FIG. 7] A diagram showing an example of the specific configuration of a constant-current control circuit 20 of the step-up circuit 100C of the third embodiment.

FIG. 7 is a diagram showing an example of the specific configuration of the constant-current control circuit 20 shown in FIG. 5, along with a current mirror circuit 10.

In FIG. 7, between the input voltage point (the power supply voltage point) and the ground, a PMOS 241 whose gate and drain are connected together and a constant-current source circuit 240 that is controlled by the operation signal ST so as to be turned on or off and that passes a constant current I00 when it is on are connected in series. There is also provided a PMOS 242 whose source and gate are connected to those of the PMOS 241 and whose current mirror ratio is 1:M1 (for example, M1 is 10).

Between the drain of the PMOS 242 and the ground, a PMOS 243 and an N-type MOS transistor (hereinafter an NMOS) 244 whose drain and gate are connected together are connected in series, and a PMOS 245 and an NMOS 246 are connected in series. The first detection voltage Vdet1 is applied to the gate of the PMOS 243, and the reference voltage Vref is applied to the gate of the PMOS 245. The PMOS 243, the NMOS 244, the PMOS 245, and the NMOS 246 together form a first differential amplifier circuit.

Between the power supply voltage point and the ground, a PMOS 262 whose gate and drain are connected together and an NMOS 261 whose gate is connected to the gate of the NMOS 246 are connected in series, and a PMOS 264 whose gate is connected to the gate of the PMOS 262 and an NMOS 263 whose gate is connected to the gate of the NMOS 244 are connected in series. The current mirror ratio between the PMOS 262 and the PMOS 264 is set to 1:1. The current mirror ratio between the NMOS 246 and the NMOS 261 and the current mirror ratio between the NMOS 244 and the NMOS 263 are both set to 1:1.

Between a node at which the PMOS 264 and the NMOS 263 are connected in series and the power supply voltage point, a PMOS 265 whose gate and drain are connected together is provided. Between the power supply voltage point and the ground, a PMOS 266 whose gate is connected to the gate of the PMOS 265 and an NMOS 267 whose drain and gate are connected together are connected in series. The current mirror ratio between the PMOS 265 and the PMOS 266 is set to 1:M3 (for example, M3 is 50).

Between the drain of the PMOS 11 of the current mirror circuit 10 and the ground, an NMOS 268 whose gate is connected to the gate of the NMOS 267 is provided. The current mirror ratio between the NMOS 267 and the NMOS 268 is set to 1:1.

In the constant-current control circuit 20 shown in FIG. 7, control operation similar to that described in FIGS. 5 and 6 is performed. That is, when the operation signal ST is produced (i.e., turned to H level), the constant-current control circuit 20 starts operating. In the first differential amplifier circuit, differential amplification is performed on the first detection voltage Vdet1 and the reference voltage Vref. According to the result of the differential amplification, the reference constant current Iref is adjusted.

Figure 8:
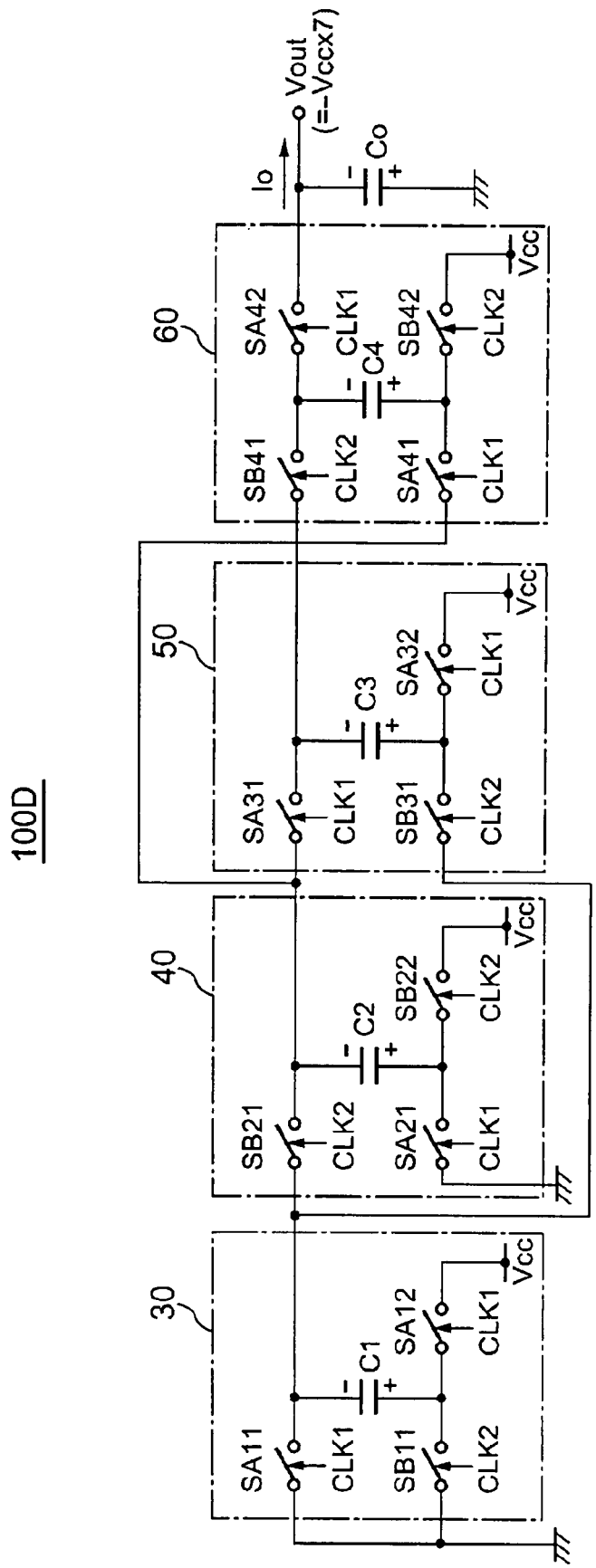
[FIG. 8] A diagram showing a step-up circuit 100D of a fourth embodiment.

FIG. 8 is a diagram showing a fourth embodiment of the step-up circuit 100 (hereinafter a step-up circuit 100D). The step-up circuit 100D of this embodiment outputs an output voltage Vout that is a negative voltage obtained by stepping up the input voltage Vcc so as to be greater than the input voltage Vcc in absolute value.

The embodiment shown in FIG. 8 differs from the second embodiment shown in FIG. 4 in the following respects. In the charge pump units 30 to 60, the nodes that are connected to the ground in FIG. 4 are connected to the input potential point in FIG. 8, and the nodes that are connected to the input potential point in FIG. 4 are connected to the ground in FIG. 8.

As described above, in the step-up circuit 100D of this embodiment, the reference potential point in the first and second embodiments is changed to a potential point of the input voltage, and a predetermined potential point is changed to the ground potential point. In this way, by simply changing the node potentials to the potential point of the input voltage and the ground, it is possible to produce a negatively stepped-up voltage from the input voltage Vcc instead of producing a positively stepped-up voltage Vout therefrom.

Figure 9:
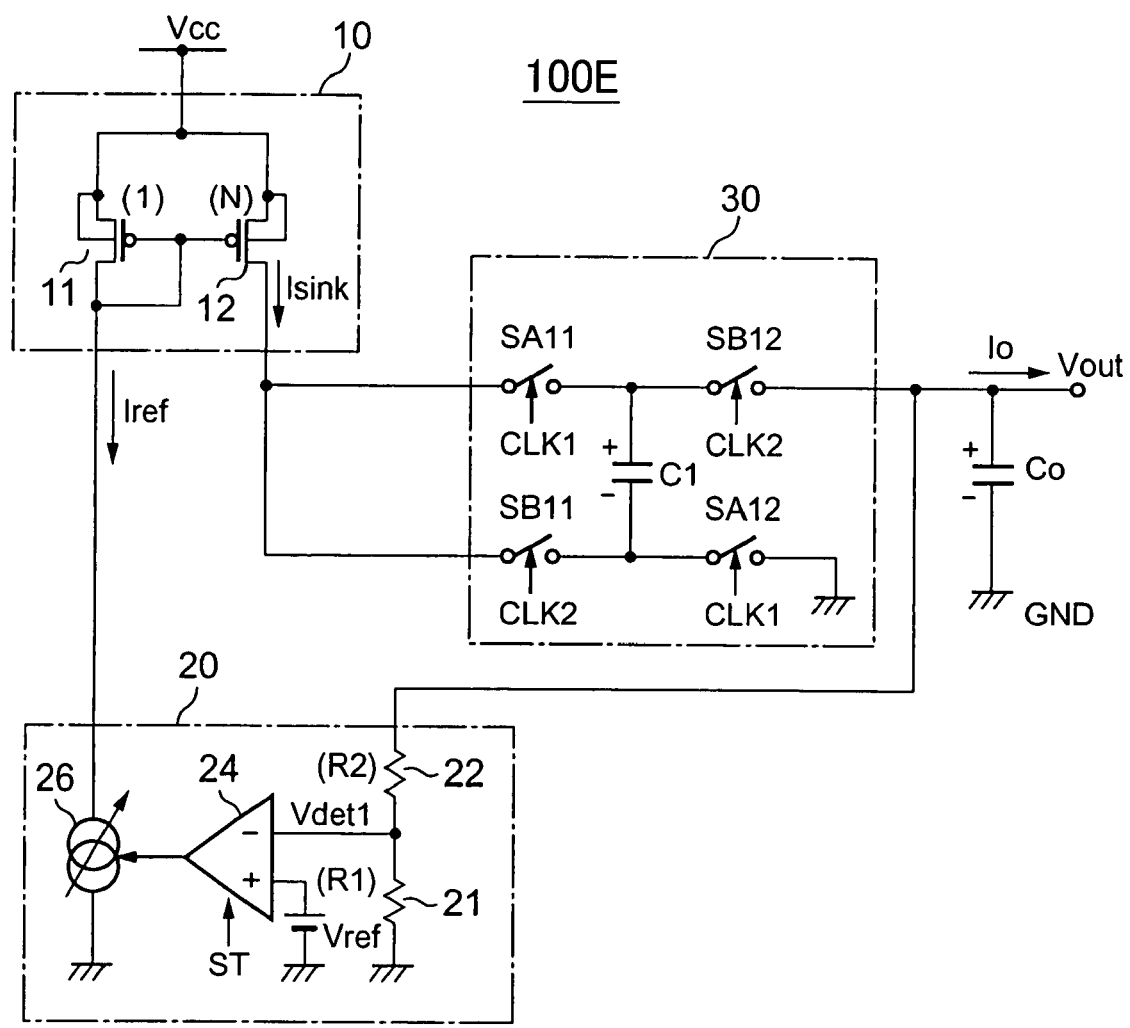
[FIG. 9] A diagram showing a step-up circuit 100E of a fifth embodiment.

FIG. 9 is a diagram showing a fifth embodiment of the step-up circuit 100 (hereinafter a step-up circuit 100E). As shown in this figure, the step-up circuit 100E of this embodiment is similar to that of the third embodiment in that it has a current-operated charge pump unit 30 as a step-up unit, but differs from the first to fourth embodiments in that it does not have a configuration in which a plurality of stages of step-up units are connected sequentially.

The current-operated charge pump unit 30 includes: a flying capacitor C1; a first switch SA11 that is connected between a constant-current output node from which an input constant current Isink of a current mirror circuit 10 is outputted and one end of the capacitor C1, and that is turned on/off according to a first clock CLK1; a third switch SA12 that is connected between the other end of the capacitor C1 and a reference potential point (for example, a ground) and is turned on/off according to the first clock CLK1; and a second switch SB11 that is connected between the constant-current output node from which the input constant current Isink is outputted and the other end of the capacitor C1, and that is turned on/off according to a second clock CLK2 that is nearly opposite in phase to the first clock CLK1.

Furthermore, a fourth switch SB12 is provided that is connected between one end of the capacitor C1 and an output voltage point, and that is turned on/off according to the second clock CLK2. The fourth switch SB12 prevents backflow from an output capacitor Co. Thus, in a case where a plurality of stages of charge pump units are connected sequentially, the fourth switch is provided only in the final-stage charge pump unit. In other words, the fourth switch simply has to be provided on the input side of the output capacitor Co outside the final-stage charge pump unit.

It is to be noted that the circuit configurations and operations of a current mirror circuit 10 and a constant-current control circuit 20 and the output voltage Vout-input constant current Isink characteristics are similar to those of the third embodiment specifically described with referenced to FIGS. 5 to 7. Thus, also in the charge pump unit 30 of this embodiment, stepping-up operation is performed by the input constant current Isink, and the resultant stepped-up voltage is outputted. By this stepped-up voltage, the output capacitor Co connected to the output voltage point is charged to the output voltage Vout. The resultant output voltage Vout is outputted to the load as an operating voltage, and an output current Io that meets the needs of the load is outputted.

As described above, the step-up circuit 100E of this embodiment is composed of: a constant-current control circuit 20 that produces a first reference current Ir1 as the reference constant current Iref when the first detection voltage Vdet1 according to the output voltage Vout is lower than the reference voltage Vref, and that stops the reference constant current Iref when the first detection voltage Vdet1 exceeds the reference voltage Vref; and at least one constant-current operated step-up unit 30 in which stepping-up operation is performed by the input constant current Isink according to the reference constant current Iref. With this configuration, stepping-up operation is performed by a given input constant current Isink. This makes it possible to provide stable output of an output voltage Vout at a predetermined level.

In addition, since a given input constant current Isink (a first input constant current Is1) is supplied to the charge pump unit 30, no inrush current is generated during start-up. This reduces the burden on a power supply such as a battery power supply BAT, and helps reduce a variation in the power supply voltage Vcc.

Next, a sixth embodiment of the step-up circuit 100 (hereinafter a step-up circuit 100F) will be described. The step-up circuit 100F of this embodiment has almost the same configuration as that of the fifth embodiment described above, and the distinctive feature thereof lies in that the configuration of a constant-current control circuit 20 is so modified as to have the output voltage Vout-input constant current Isink characteristics shown in FIG. 10 by reducing the level of increase in an input constant current Isink.

Figure 10:
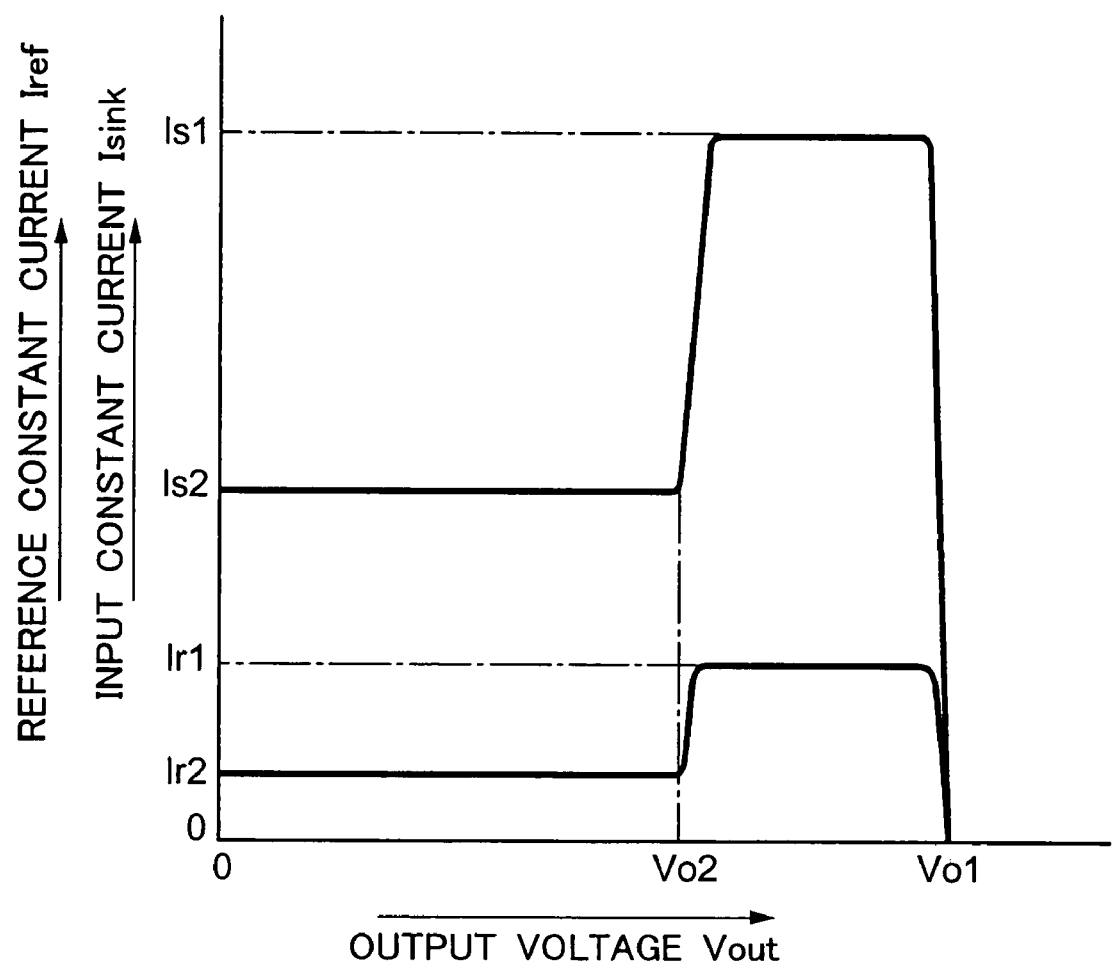
[FIG. 10] A diagram showing the output voltage-input constant current characteristics of a step-up circuit 100F of a sixth embodiment.

To achieve the characteristics shown in FIG. 10, in the constant-current control circuit 20, in addition to the first detection voltage Vdet1 described above, a second detection voltage Vdet2 that varies according to the output voltage Vout and is higher than the first detection voltage Vdet1 is used. The second detection voltage Vdet2 is set so as to equal the reference voltage Vref when the output voltage Vout has reached a given second output voltage V02 that is lower than a first output voltage Vo1.

When the second detection voltage Vdet2 is lower than the reference voltage Vref, a second reference current Ir2 that is smaller than a first reference current Ir1 is produced as a reference constant current Iref. Thus, in this state, the input constant current Isink is a second input constant current Is2 that is smaller than a first input constant current Is1.

When the output voltage Vout reaches the second output voltage V02, the second detection voltage Vdet2 exceeds the reference voltage Vref. Thus, the constant-current control circuit 20 produces the first reference current Ir1. As a result, the input constant current Isink increases to the first input constant current Is1.

As described above, automatic switching is performed in the following manner. When the output voltage Vout is low, a smaller second input constant current Is2 is supplied; when the output voltage Vout has reached a predetermined level, a larger first input constant current Is1 is supplied. This makes a current gradually increase from zero to the second input constant current Is2, and then from the second input constant current Is2 to the first input constant current Is1. Accordingly, it is possible to further reduce the burden on the power supply such as a battery power supply BAT.

Figure 11:
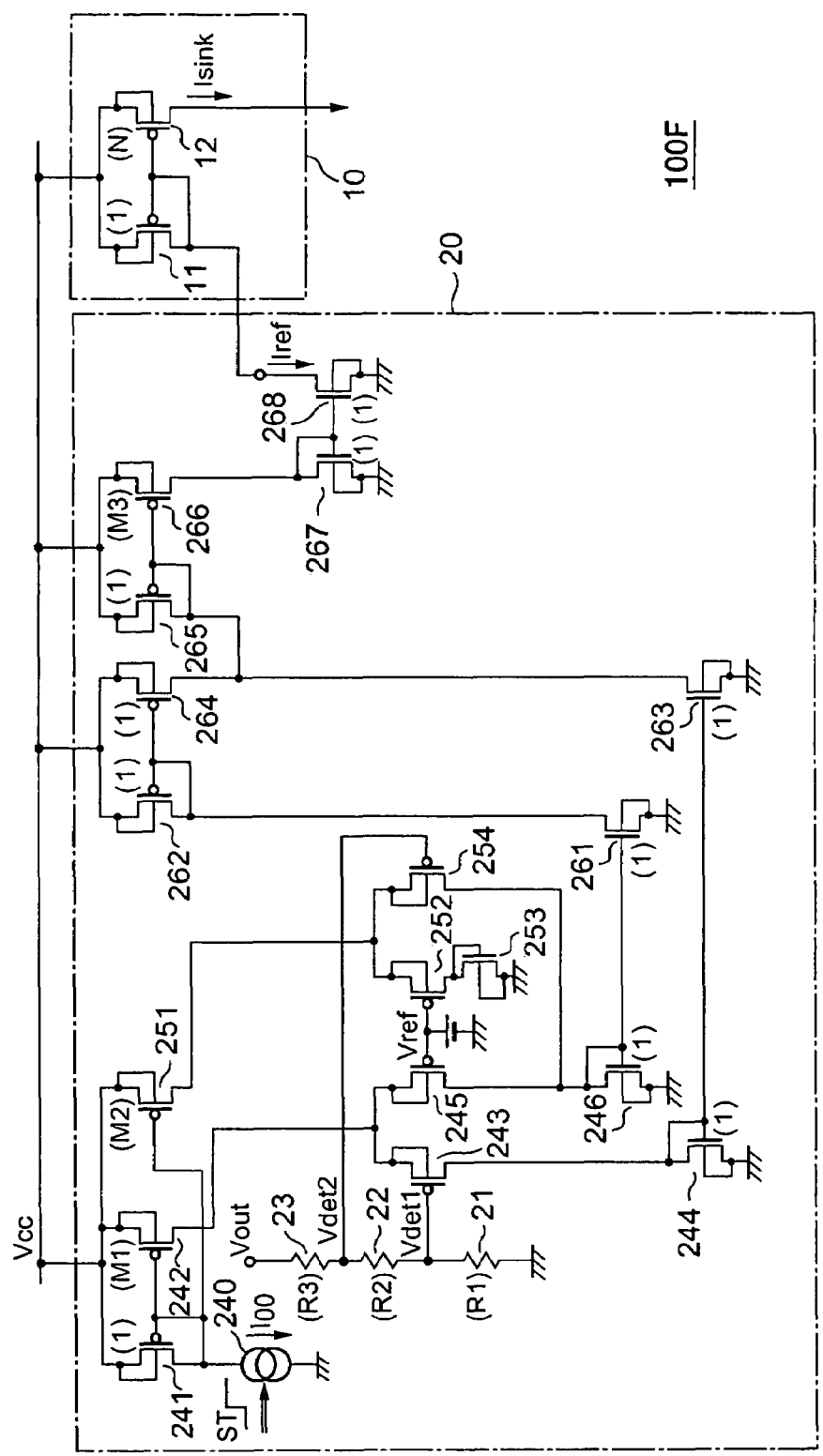
[FIG. 11] A diagram showing an example of the specific configuration of a constant-current control circuit 20 of the step-up circuit 100F of the sixth embodiment.

An example of the specific configuration of the constant-current control circuit 20 that achieves the characteristics shown in FIG. 10 is shown in FIG. 11, along with a current mirror circuit 10.

In the following description, only differences between the configuration shown in FIG. 11 and that shown in FIG. 7 are explained. In FIG. 11, there is provided a PMOS 251 whose gate and source are connected to the gate and source of the PMOS 242 and that forms a current mirror configuration together with a PMOS 241 and a PMOS 242. The current mirror ratio among the PMOS 241, the PMOS 242, and the PMOS 251 is set to 1:M1:M2 (for example, 1:10:7). That is, M1>M2.

Voltage divider resistors 21, 22, and 23 divide the output voltage Vout so as to produce a first detection voltage Vdet1 and a second detection voltage Vdet2 that is higher than the first detection voltage Vdet1. The first detection voltage Vdet1 may be at the same voltage level as that of the fifth embodiment described above. The second detection voltage Vdet2 is always higher than the first detection voltage Vdet1 by a given ratio irrespective of a variation in the output voltage Vout.

Between the drain of the PMOS 251 and the ground, a PMOS 252 and an NMOS 253 whose drain and gate are connected together are connected in series. Between the drain of the PMOS 251 and a node at which a PMOS 245 and an NMOS 246 are connected in series, a PMOS 254 is connected. The second detection voltage Vdet2 is applied to the gate of the PMOS 254, and the reference voltage Vref is applied to the gate of the PMOS 252. The PMOS 252, the NMOS 253, and the PMOS 254 together form a second differential amplifier circuit.

In the constant-current control circuit 20 shown in FIG. 11, differential amplification is performed on the reference voltage Vref and the second detection voltage Vdet2 in the second differential amplifier circuit. As a result of this differential amplification, during the interval that the output voltage Vout is lower than the second output voltage Vo2, the current through the PMOS 251 passes through the PMOS 254 and the NMOS 246.

In this state, the current passing through the PMOS 265 equals the difference between the current passing through the NMOS 244 and the current passing through the NMOS 246, namely 100×(M1−M2).

Thus, since the reference constant current Iref is a second reference current Ir2 that is smaller than a first reference current Ir1, the input constant current Isink is a second input current Is2 that is smaller than a first input constant current Is1. How much the second input current Is2 is smaller than the first input constant current Is1 is determined by the mirror ratio between the PMOS 242 and the PMOS 251, namely M1:M2.

When the output voltage Vout increases and the second detection voltage Vdet2 exceeds the reference voltage Vref, the PMOS 254 is turned off and the PMOS 252 is turned on. In this state, since the same operation as in the fifth embodiment is performed, the input constant current Isink is the first input constant current Is 1.

Next, a seventh embodiment of the step-up circuit 100 (hereinafter a step-up circuit 100G) will be described. The step-up circuit 100G of this embodiment has almost the same configuration as that of the sixth embodiment described above, and the distinctive feature thereof lies in that the configuration of a constant-current control circuit 20 is so modified that the output voltage Vout is increased to a first output voltage Vo1 by a smaller input constant current Isink (a second input constant current Is2), and a variation in load that subsequently occurs is dealt with by a larger input constant current Isink (a first input constant current Is1).

An example of the specific configuration of the constant-current control circuit 20 that realizes the operation described above is shown in FIG. 12, along with a current mirror circuit 10.

As shown in this figure, the constant-current control circuit 20 is composed of: a first differential amplifier circuit to which a first detection voltage Vdet1 and a reference voltage Vref are inputted and that performs differential amplification on these inputs; a timer circuit 260 that receives an operation signal ST and counts a predetermined time period τ; and a second differential amplifier circuit to which an output of the timer circuit 260 and the reference voltage Vref are inputted and that performs differential amplification on these inputs.

Based on the operation of the first and second differential amplifier circuits, it is determined whether to produce, as a reference constant current Iref, one of the first second reference currents Ir1 and Ir2 or stop the reference constant current Iref.

Figure 12:
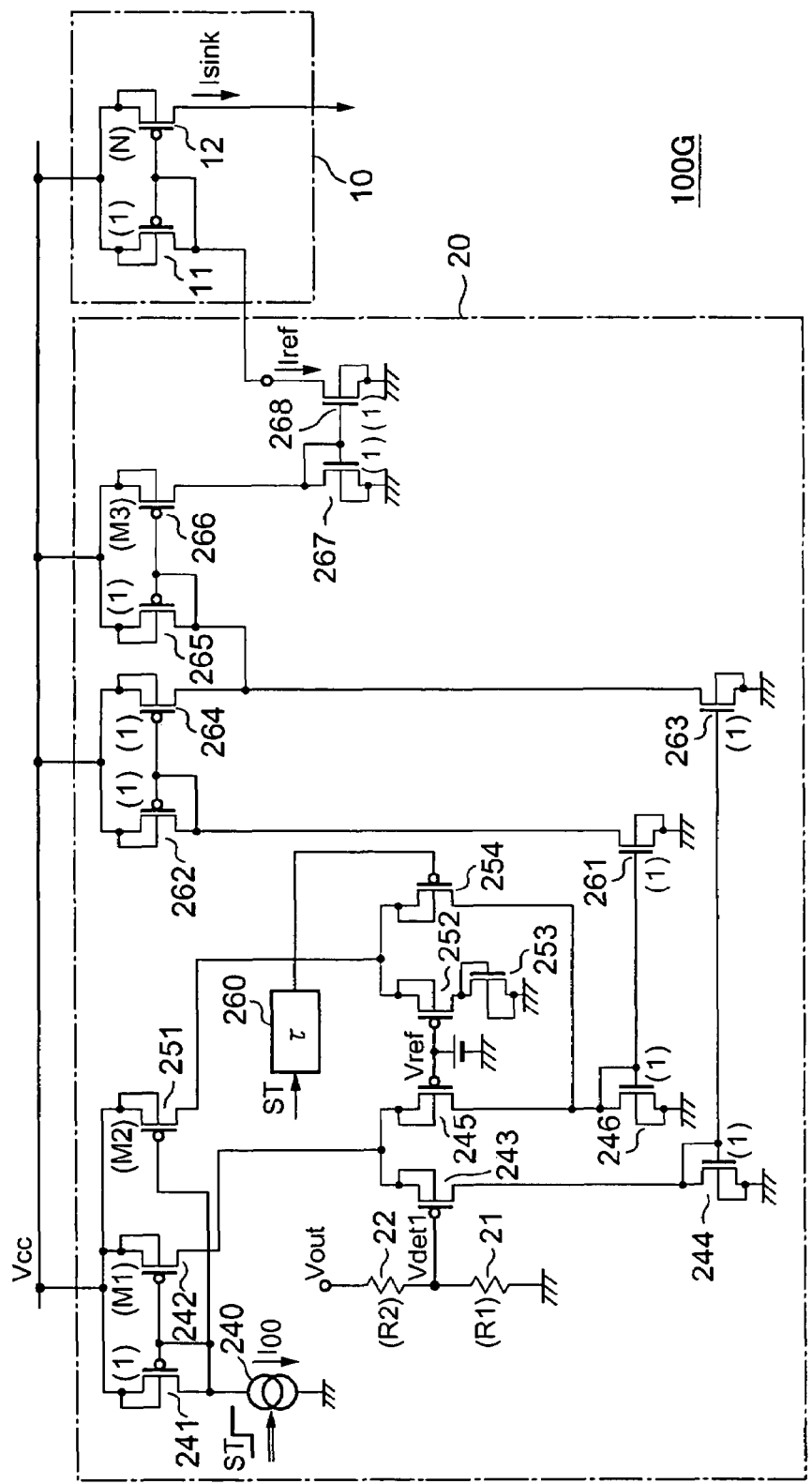
[FIG. 12] A diagram showing an example of the specific configuration of a constant-current control circuit 20 of a step-up circuit 100G of a seventh embodiment.

In FIG. 12, the timer circuit 260 is provided that produces an L level output signal only for the predetermined time period τ after the operation signal ST is produced. The output signal of the timer circuit 260 is fed to the gate of a PMOS 254 of the second differential amplifier circuit. Thus, unlike the sixth embodiment described above, the seventh embodiment requires no second detection voltage Vdet2.

The predetermined time period τ is set to a time period that is long enough for the output voltage Vout to reach the first output voltage Vo1. Alternatively, the predetermined time period τ can be set to a time period during which the output voltage Vout is lower than the first output voltage Vo1, so as to achieve the characteristics shown in FIG. 10 as needed.

According to the seventh embodiment, although the time that the output voltage Vout takes to reach the first output voltage Vo1 is lengthened, it is possible to further reduce the burden on a battery power supply BAT. Furthermore, due to a high current supply capability during normal operation, it is possible to enhance the response to a variation in the output voltage Vout.

Figure 13:
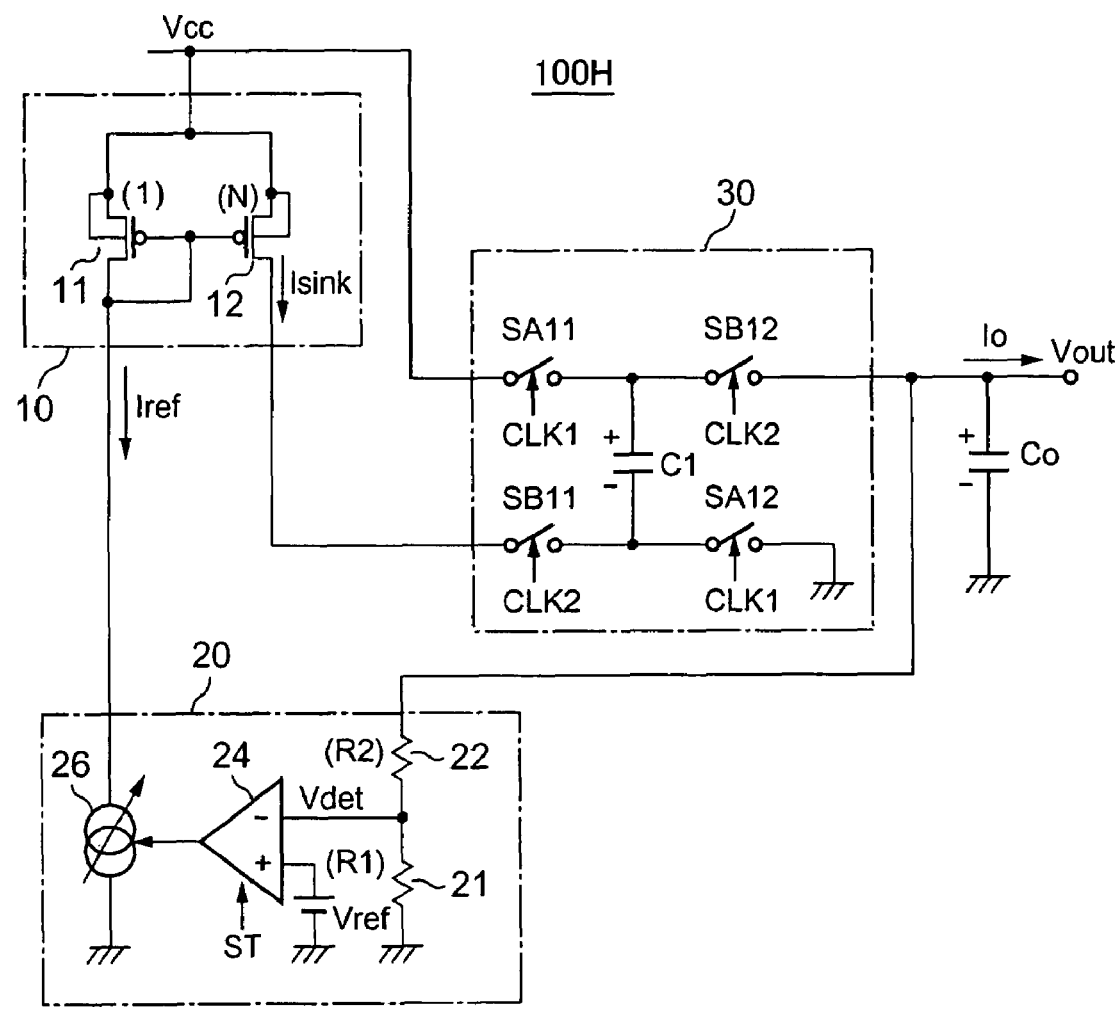
[FIG. 13] A diagram showing a step-up circuit 100H of an eighth embodiment.

FIG. 13 is a diagram showing an eighth embodiment of the step-up circuit 100 (hereinafter a step-up circuit 100H). As shown in this figure, the step-up circuit 100H of this embodiment has almost the same configuration as that of the fifth embodiment shown in FIG. 9, but differs therefrom in that a first switch SA11 is connected to a power supply voltage point instead of an output node of a current mirror circuit 10.

In the step-up circuit 100H of this embodiment, when the first and third switches SA11 and SA12 are on, only during that on period T, the capacitor C1 is charged by a power supply voltage Vcc that is applied through a first path from the first switch SA11 to the third switch SA12 via the capacitor C1, so as to have the polarity shown in the figure.

On the other hand, when the second and fourth switches SB11 and SB12 are on, stepping-up operation is performed by a constant current, i.e., a first input constant current Is1 passing along a second path from the second switch SB11 to the output capacitor Co via the capacitor C1 and the fourth switch SB12, so that the output capacitor Co is charged so as to have the polarity shown in the figure.

Charging by a constant current flowing through the first path and stepping-up by a constant current flowing through the second path are repeatedly performed according to the first and second clocks CLK1 and CLK2. As a result, the output voltage Vout gradually increases.

As the output voltage Vout gets closer to a target voltage, namely a first output voltage Vo1, the differential output of the differential amplifier circuit 24 becomes smaller, and accordingly the reference constant current Iref decreases from the first reference current Ir1 toward zero. When the output voltage Vout has reached or exceeded the first output voltage Vo1, the differential output of the differential amplifier circuit 24 becomes zero or negative, and accordingly the reference constant current Iref becomes zero. At this point, only charging by a constant current flowing through the first path is performed. Therefore, the input constant current Isink also becomes zero, and accordingly the stepping-up operation of the step-up circuit 100H is suspended.

Figure 14:
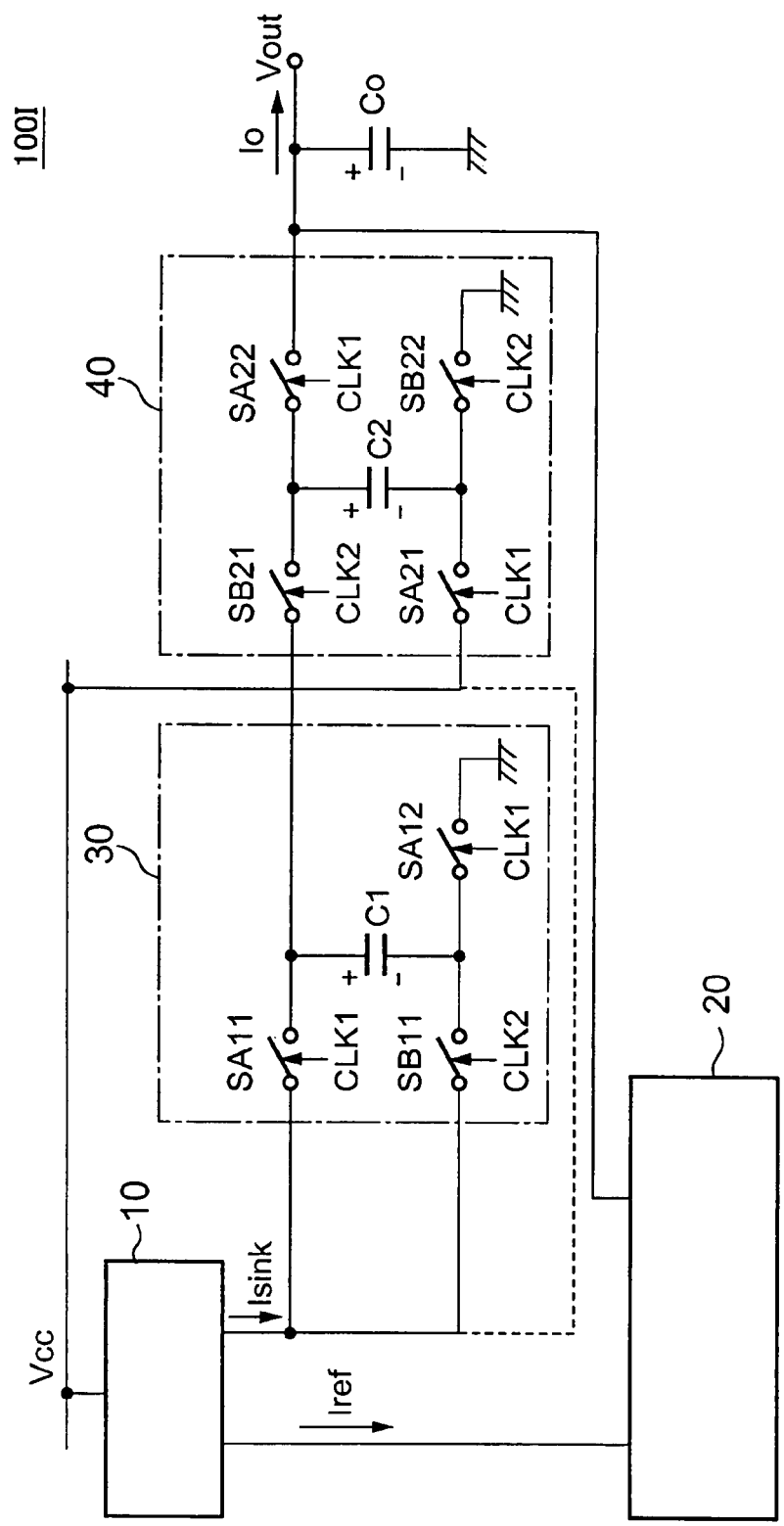
[FIG. 14] A diagram showing a step-up circuit 100I of a ninth embodiment.

FIG. 14 is a diagram showing a ninth embodiment of the step-up circuit 100 (hereinafter a step-up circuit 100I). As shown in this figure, the step-up circuit 100I of this embodiment includes a plurality of stages of charge pump units.

In the step-up circuit 100I of this embodiment, as a first-stage charge pump unit thereof, a constant-current operated charge pump unit 30 described in the fifth embodiment of FIG. 9 is used. Furthermore, as a charge pump unit in a stage following the constant-current operated charge pump unit 30, a voltage operated charge pump unit 40 is used.

The configuration shown in FIG. 14 may be modified so that a current-operated charge pump unit is used as the charge pump unit 40. In that case, the switch SA21 connected to the input voltage Vcc in FIG. 14 is connected to the output node of the current mirror circuit 10 as indicated by the dashed line in the same figure. Specifically, in this modified example, the charge pump units 30 and 40 are both of a current-operated type.

Figure 15:
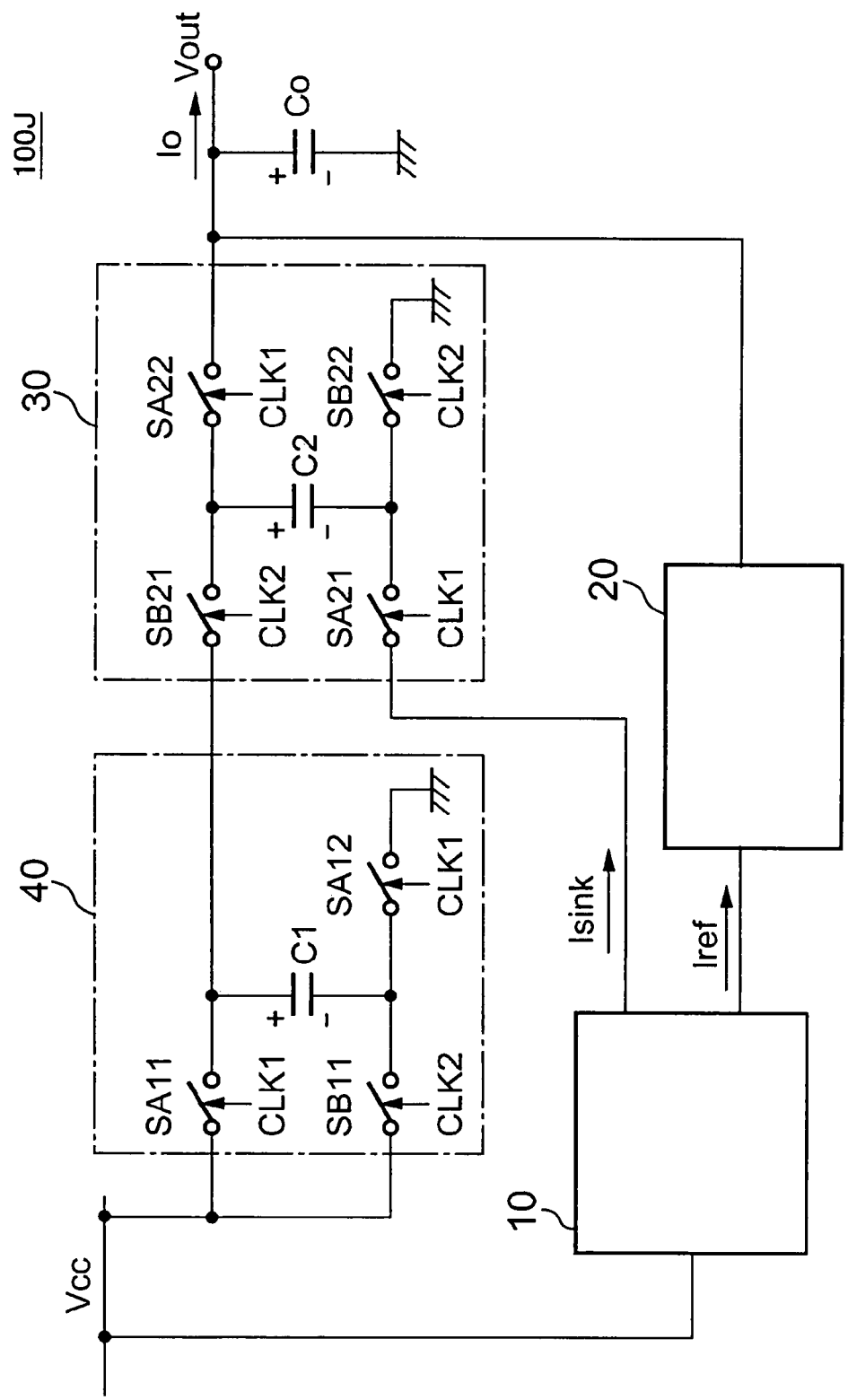
[FIG. 15] A diagram showing a step-up circuit 100J of a tenth embodiment.

FIG. 15 is a diagram showing a tenth embodiment of the step-up circuit 100 (hereinafter a step-up circuit 100J). As shown in this figure, the step-up circuit 100J of this embodiment, like that described in the ninth embodiment, includes a plurality of stages of charge pump units.

In the step-up circuit 100J of this embodiment, as a first-stage charge pump unit thereof, a voltage operated charge pump unit 40 is used. Furthermore, as a charge pump unit in a stage following the voltage operated charge pump unit 40, a constant-current operated charge pump unit 30 described in the eighth embodiment shown in FIG. 13 is used.

Even in a step-up circuit including a plurality of stages of charge pump units, like those described in the ninth and tenth embodiments shown in FIGS. 14 and 15, respectively, by using, as at least one of them, a charge pump unit of a current-operated type, it is possible to perform, like in the fifth to eighth embodiments, stepping-up operation by a constant current and constant-voltage control of the output voltage Vout.

What is claimed is:

1. A step-up circuit that steps up an input voltage and outputs an output voltage, the step-up circuit comprising:
   a constant-current control circuit arranged to produce a first reference current as a reference constant current when a first detection voltage according to the output voltage is lower than a reference voltage, and arranged to stop the reference constant current when the first detection voltage exceeds the reference voltage, wherein the constant-current control circuit is further arranged to produce, as the reference constant current, a second reference current that is smaller than the first reference current when a second detection voltage, according to the output voltage, is lower than the reference voltage, the second detection voltage being higher than the first detection voltage, and arranged to produce the first reference current when the second detection voltage exceeds the reference voltage; and
   at least one constant-current operated step-up unit arranged such that stepping-up operation is performed by an input constant current according to the reference constant current,
   wherein the constant-current control circuit comprises:
      a first differential amplifier circuit to which the first detection voltage and the reference voltage are inputted, the first differential amplifier circuit performing differential amplification on the first detection voltage and the reference voltage inputted thereto; and
      a second differential amplifier circuit to which the second detection voltage and the reference voltage are inputted, the second differential amplifier circuit performing differential amplification on the second detection voltage and the reference voltage inputted thereto,
      wherein, based on operation of the first and second differential amplifier circuits, the constant-current control circuit determines whether to produce, as the reference constant current, one of the first and second reference currents or stop the reference constant current.

2. The step-up circuit of claim 1, wherein the constant-current control circuit
   starts operating in response to an operation signal inputted thereto, and
   produces, as reference constant current, a second reference current that is smaller than the first reference current until a predetermined time period elapses after the operation signal is inputted, and produces the first reference current when the predetermined time period has elapsed.

3. A portable device, comprising:
a battery power supply that outputs an input voltage;
the step-up circuit of claim 1 to which the input voltage is inputted; and
a load to which an output voltage from the step-up circuit is supplied.

4. The step-up circuit of claim 1, further comprising:
a current mirror circuit that amplifies the reference constant current by a predetermined factor of N (N>1) and passes the input constant current from an constant-current output node to the constant-current operated step-up unit.

5. The step-up circuit of claim 4, wherein the constant-current operated step-up unit comprises:
a capacitor;
a first switch connected between the constant-current output node and one end of the capacitor, the first switch being turned on/off according to a first clock;
a third switch connected between another end of the capacitor and a reference potential point, the third switch being turned on/off according to the first clock; and
a second switch connected between the constant-current output node and the another end of the capacitor, the second switch being turned on/off according to a second clock that is nearly opposite in phase to the first clock.

6. The step-up circuit of claim 4, wherein the constant-current operated step-up unit comprises:
a capacitor;
a first switch connected between an input voltage point or an output node of a step-up unit in a preceding stage and one end of the capacitor, the first switch being turned on/off according to a first clock;
third switch means connected between another end of the capacitor and a reference potential point, the third switch means being turned on/off according to the first clock; and
a second switch connected between the constant-current output node and the another end of the capacitor, the second switch being turned on/off according to a second clock that is nearly opposite in phase to the first clock.

7. A step-up circuit that steps up an input voltage and outputs an output voltage, the step-up circuit comprising:
a constant-current control circuit arranged to produce a first reference current as a reference constant current when a first detection voltage according to the output voltage is lower than a reference voltage, and arranged to stop the reference constant current when the first detection voltage exceeds the reference voltage, wherein the constant-current control circuit is further arranged to start operating in response to an operation signal inputted thereto, to produce, as the reference constant current, a second reference current that is smaller than the first reference current until a predetermined time period elapses after the operation signal is inputted, and to produces the first reference current when the predetermined time period has elapsed; and
at least one constant-current operated step-up unit arranged such that stepping-up operation is performed by an input constant current according to the reference constant current,
wherein the constant-current control circuit comprises:
a first differential amplifier circuit to which the first detection voltage and the reference voltage are inputted, the first differential amplifier circuit performing differential amplification on the first detection voltage and the reference voltage inputted thereto;
a timer circuit that counts the predetermined time period in response to the operation signal inputted thereto; and
a second differential amplifier circuit to which an output of the timer circuit and the reference voltage are inputted, the second differential amplifier circuit performing differential amplification on the output of the timer circuit and the reference voltage inputted thereto,
wherein, based on operation of the first and second differential amplifier circuits, the constant-current control circuit determines whether to produce, as the reference constant current, one of the first and second reference currents or stop the reference constant current.

8. A portable device, comprising:
a battery power supply that outputs an input voltage;
the step-up circuit of claim 7 to which the input voltage is inputted; and
a load to which an output voltage from the step-up circuit is supplied.

9. The step-up circuit of claim 7, further comprising:
a current mirror circuit that amplifies the reference constant current by a predetermined factor of N (N>1) and passes the input constant current from an constant-current output node to the constant-current operated step-up unit.

10. The step-up circuit of claim 9, wherein the constant-current operated step-up unit comprises:
a capacitor;
a first switch connected between the constant-current output node and one end of the capacitor, the first switch being turned on/off according to a first clock;
a third switch connected between another end of the capacitor and a reference potential point, the third switch being turned on/off according to the first clock; and
a second switch connected between the constant-current output node and the another end of the capacitor, the second switch being turned on/off according to a second clock that is nearly opposite in phase to the first clock.

11. The step-up circuit of claim 9, wherein the constant-current operated step-up unit comprises:
a capacitor;
a first switch connected between an input voltage point or an output node of a step-up unit in a preceding stage and one end of the capacitor, the first switch being turned on/off according to a first clock;
third switch means connected between another end of the capacitor and a reference potential point, the third switch means being turned on/off according to the first clock; and
a second switch connected between the constant-current output node and the another end of the capacitor, the second switch being turned on/off according to a second clock that is nearly opposite in phase to the first clock.

* * * * *